(12) United States Patent
Matsuo et al.

(10) Patent No.: US 11,035,318 B2
(45) Date of Patent: *Jun. 15, 2021

(54) CONTROL DEVICE FOR COMPRESSION IGNITION ENGINE

(71) Applicant: Mazda Motor Corporation, Hiroshima (JP)

(72) Inventors: Takeru Matsuo, Higashihiroshima (JP); Yoshie Kakuda, Hiroshima (JP); Sangkyu Kim, Higashihiroshima (JP); Daisuke Shimo, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/711,762

(22) Filed: Dec. 12, 2019

(65) Prior Publication Data
US 2020/0200118 A1 Jun. 25, 2020

(30) Foreign Application Priority Data
Dec. 25, 2018 (JP) .............................. JP2018-240608

(51) Int. Cl.
*F02D 41/40* (2006.01)
*F02D 41/04* (2006.01)
*F02D 41/30* (2006.01)

(52) U.S. Cl.
CPC ........... *F02D 41/403* (2013.01); *F02D 41/04* (2013.01); *F02D 41/3041* (2013.01)

(58) Field of Classification Search
CPC .......... F02D 1/16; F02D 35/02; F02D 35/023; F02D 35/025; F02D 35/027; F02D 2001/0085; F02D 41/04; F02D 41/14; F02D 41/1438; F02D 41/26; F02D 41/30; F02D 41/3035; F02D 41/3041; F02D 41/34;
(Continued)

(56) References Cited

U.S. PATENT DOCUMENTS

2014/0360444 A1* 12/2014 Morita .................. F02D 35/026
123/41.08
2016/0341135 A1* 11/2016 Shirahashi ............ F02D 35/027
2017/0101944 A1* 4/2017 Umeno .................... G06F 17/18
(Continued)

FOREIGN PATENT DOCUMENTS

JP 2016166587 A 9/2016

*Primary Examiner* — John Kwon
*Assistant Examiner* — Johnny H Hoang
(74) *Attorney, Agent, or Firm* — Alleman Hall Creasman & Tuttle LLP

(57) ABSTRACT

A control device for a compression ignition engine is provided, which causes an injector to perform a pre-injection and a main injection, sets fuel injection timings of these injections so that an interval between a first peak of a heat release rate resulting from the combustion of fuel injected by the pre-injection and a second peak of the heat release rate resulting from the combustion of fuel injected by the main injection becomes an interval to make pressure waves caused by these combustions cancel each other out, and when an increase of an intake air temperature is detected, controls the injector to reduce the injection amount of the pre-injection and retard the injection timing of the pre-injection compared with a case where the increase of the intake air temperature is not detected under a condition that engine load and speed are the same.

8 Claims, 22 Drawing Sheets

(58) Field of Classification Search
CPC ...... F02D 41/40; F02D 41/402; F02D 41/403; F02D 41/405; Y02T 10/44
USPC ......... 701/102–105; 123/299–301, 434, 435, 123/681, 687, 691, 697
See application file for complete search history.

(56) References Cited

U.S. PATENT DOCUMENTS

| | | | |
|---|---|---|---|
| 2017/0184047 A1* | 6/2017 | Shirahashi | F02D 41/402 |
| 2017/0184048 A1* | 6/2017 | Shirahashi | F02D 41/403 |
| 2017/0184049 A1* | 6/2017 | Shirahashi | F02D 41/403 |
| 2019/0285008 A1* | 9/2019 | Yoneya | F02D 35/023 |

* cited by examiner

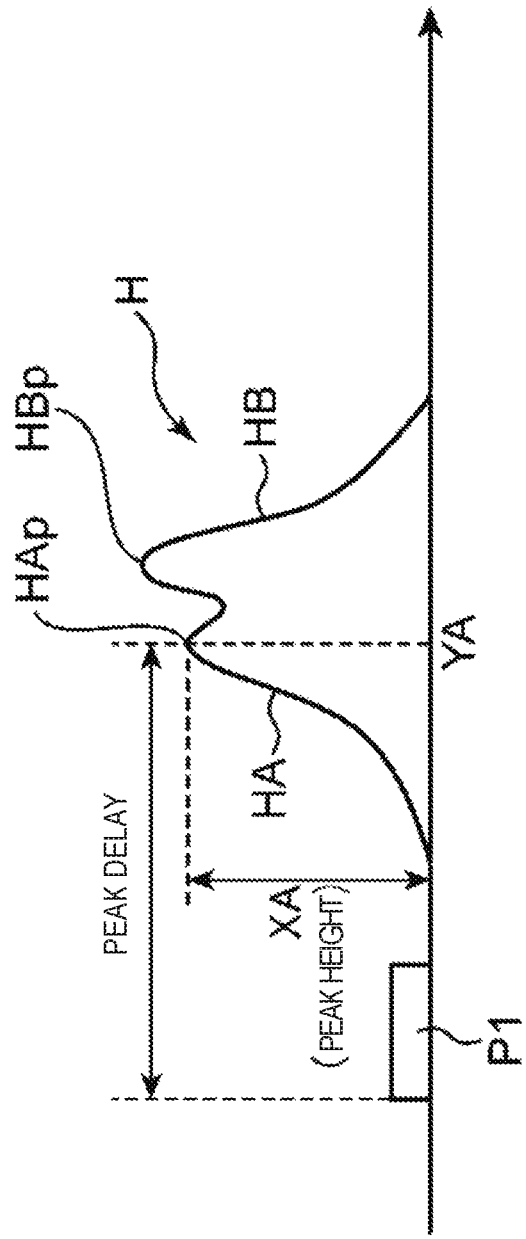

FIG. 11A

ESTIMATING MODEL EQUATION FOR PEAK DELAY (ARRHENIUS ESTIMATION)

PEAK DELEAY = $A \times$ INJECTION AMOUNT$^B \times$ INJECTION TIMING$^C \times$ INJECTION PRESSURE$^D$
$\times$ IN-CYLINDER PRESSURE$^E \times \exp(F/$IN-CYLINDER GAS TEMPERATURE) $\times$ WALL SURFACE TEMPERATURE$^G$
$\times$ IN-CYLINDER OXYGEN CONCENTRATION$^H \times$ ENGINE SPEED$^I$

FIG. 11B

CALIBRATION RESULT OF ESTIMATION MODEL EQUATION

| INDEX | A | B | C | D | E | F | G | H | I |
|---|---|---|---|---|---|---|---|---|---|
| ITEM | INTERCEPT | INJECTION AMOUNT | INJECTION TIMING | INJECTION PRESSURE | IN-CYLINDER PRESSURE | IN-CYLINDER GAS TEMP | WALL SURFACE TEMP | IN-CYLINDER OXYGEN CONCENTRATION | ENGINE SPEED |
| MULTIPLE LINEAR REGRESSION | 246.9691168 | -0.36 | 0.55 | 0.28 | -0.79 | 3157.24 | -0.13 | -1.59 | 0.11 |

FIG. 11C

ESTIMATING MODEL EQUATION FOR PEAK HEIGHT (ARRHENIUS ESTIMATION)

$$\text{PEAK HEIGHT} = A \times \text{ENGINE SPEED}^B \times \text{PEAK DELAY}^C \times \text{COMBUSTION EFFICIENCY}^D \times \text{INJECTION AMOUNT}^E$$

FIG. 13A

CALIBRATION RESULT OF ESTIMATING MODEL EQUATION

| INDEX | A | B | C | D | E |
|---|---|---|---|---|---|
| ITEM | INTERCEPT | ENGINE SPEED | PEAK DELAY | COMBUSTION EFFICIENCY | INJECTION AMOUNT |
| MULTIPLE LINEAR REGRESSION | 0.706 | -0.62 | -0.496 | 0.81 | 1.54 |

FIG. 13B

CHANGE OF PEAK HEIGHT DUE TO PEAK DELAY

CHANGE OF PEAK HEIGHT DUE TO INJECTION AMOUNT (A)
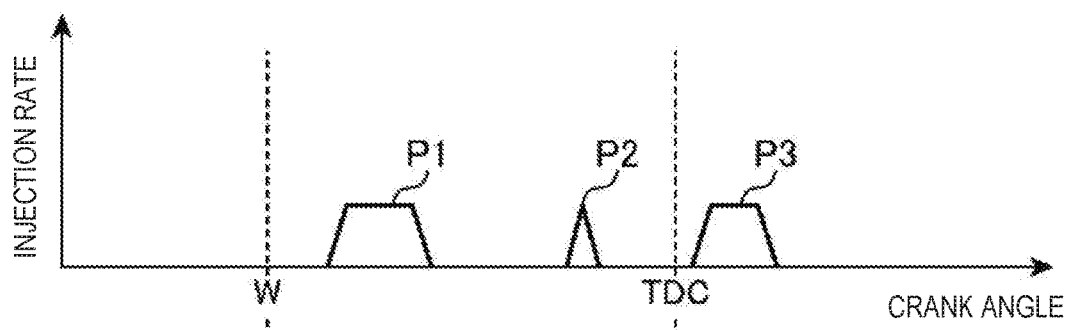
(B)
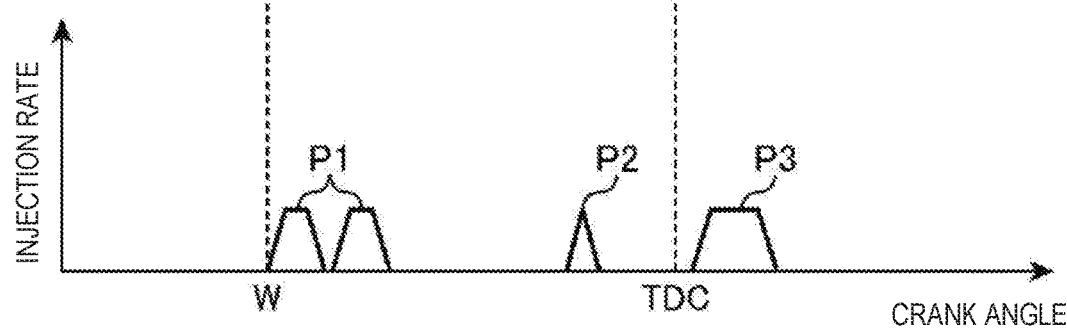
FIG. 21

CONTROL DEVICE FOR COMPRESSION IGNITION ENGINE

TECHNICAL FIELD

The present disclosure relates to a control device for a compression ignition engine which causes fuel injected into a combustion chamber from an injector to combust by compression ignition.

BACKGROUND OF THE DISCLOSURE

Conventionally, JP2016-166587A discloses a compression ignition engine which causes fuel injected multiple times (multiple injection) to combust by compression ignition. In this engine, it is known that an interval between a peak of a pressure buildup rate of combustion by a pre-injection (first fuel injection) and a peak of a pressure buildup rate of combustion by a main injection (second fuel injection) is set so that it becomes a half-cycle of a frequency band at which a combustion noise pressure level becomes the maximum.

According to the technology disclosed in JP2016-166587A, since the pressure wave of combustion by the pre-injection and the pressure wave of combustion by the main injection cancel each other out, the effect of fully reducing combustion noise can be expected.

Here, if the mode of combustion by the pre-injection in which an injection timing is early is a premixed compression ignition combustion, there is a time lag called an "ignition delay" between the start of the pre-injection and the ignition of fuel (the start of combustion). This ignition delay varies according to combustion environmental factors, such as the temperature and pressure inside the combustion chamber. When the ignition delay varies, the peak occurring timing of the pressure buildup rate of combustion by pre-injection (or the peak delay which is a period from the start of the pre-injection to the peak occurring timing) changes. As a result, since the interval between the peaks of the pressure buildup rate of the combustions by the pre-injection and the main injection is deviated from the expected interval, combustion noise may increase.

As a method of dealing with the above problem, it is possible to correct the injection timing of the main injection according to the change in the combustion environmental factors (or the change in the ignition delay caused thereby). However, the change in the injection timing of the main injection which is performed at a timing near a compression top dead center is not desirable because the change has a great influence on thermal efficiency and torque.

SUMMARY OF THE DISCLOSURE

The present disclosure is made in view of the above situations, and one purpose thereof is to provide a control device for a compression ignition engine, capable of reducing combustion noise by primarily correcting a mode of the pre-injection, when the combustion environmental factor is changed.

According to a first aspect of the present disclosure, a control device for a compression ignition engine causing fuel injected into a combustion chamber from an injector to combust by compression ignition is provided. The device includes an intake-air-temperature sensor configured to acquire an intake air temperature that is a temperature of intake air supplied to the combustion chamber, and a processor configured to execute a fuel injection controlling module to control an injection amount and an injection timing of the fuel by the injector. The fuel injection controlling module causes the injector to perform a pre-injection in which fuel is injected at an advancing side of a compression top dead center, and a main injection in which fuel is injected during combustion of the fuel injected by the pre-injection, and the fuel injection controlling module sets the fuel injection timings of the pre-injection and the main injection so that an interval between a first peak of a heat release rate resulting from the combustion of the fuel injected by the pre-injection and a second peak of the heat release rate resulting from the combustion of the fuel injected by the main injection becomes an interval to make pressure waves caused by the combustions of the fuel of the pre-injection and the main injection cancel each other out. When an increase of the intake air temperature is detected by the intake-air-temperature sensor, the fuel injection controlling module controls the injector to reduce the injection amount of the pre-injection and retard the injection timing of the pre-injection compared with a case where the increase of the intake air temperature is not detected under a condition that an engine load and an engine speed are the same.

According to this configuration, while the pre-injection and the main injection are performed so that a heat-release characteristic including the first peak and the second peak is acquired, the interval between the first peak and the second peak is set as the interval so that the pressure waves caused by the combustion of fuel of the pre-injection and the main injection cancel each other out. Therefore, a sound pressure level of the combustion noise caused by the pre-injection and the main injection can be effectively reduced by mutual interference, and a highly silent combustion where combustion noise is fully controlled can be realized.

Moreover, since the injection amount of the pre-injection is reduced and the injection timing of the pre-injection is retarded when the intake air temperature increases, the deviation of the first peak caused by the increase of the intake air temperature can be corrected, thereby preventing beforehand the increase in combustion noise which may be caused by the deviation.

In detail, when the intake air temperature increases, while the occurring timing of the first peak is moved to the advancing side of the target value (i.e., the timing at which the interval to the second peak becomes the expected interval), the height of the first peak becomes higher than the target value. On the other hand, since in this configuration the injection amount of the pre-injection is reduced and the injection timing is retarded when the increase of the intake air temperature is detected, the deviation of the first peak can be corrected, and while each of the heights of the first peak and the second peak is brought near the target values, the interval between the peaks can be maintained at the interval described above which is advantageous in terms of combustion noise. As a result, combustion noise can fully be reduced regardless of the increase in the intake air temperature, thereby effectively improving the market value of the engine.

When the increase of the intake air temperature is detected, the fuel injection controlling module may estimate an advanced deviation that is an amount by which the occurring timing of the first peak is shifted to the advancing side from a target timing due to the increase of the intake air temperature, and set a decreasing amount of the injection amount of the pre-injection so that the occurring timing of the first peak is retarded more than the estimated advanced deviation.

Moreover, when the increase of the intake air temperature is detected, the fuel injection controlling module may estimate a cutback deviation that is an amount by which a height of the first peak is decreased from a target height due to the injection amount of the pre-injection being decreased by the set decreasing amount, and set a retarding amount of the injection timing of the pre-injection so that the height of the first peak increases by an amount corresponding to the estimated cutback deviation.

According to these configurations, the decreasing amount and the retarding amount of the pre-injection can be calculated appropriately by the calculation so that the final occurring timing and the final height of the first peak which are achieved by the combination of reducing of the amount of the pre-injection and retarding of the pre-injection are brought near the target values, thereby fully reducing combustion noise.

According to a second aspect of the present disclosure, a control device for a compression ignition engine causing fuel injected into a combustion chamber from an injector to combust by compression ignition is provided. The device includes an intake-air-temperature sensor configured to acquire an intake air temperature that is a temperature of intake air supplied to the combustion chamber, and a processor configured to execute a fuel injection controlling module to control an injection amount and an injection timing of the fuel by the injector. The fuel injection controlling module causes the injector to perform a pre-injection in which fuel is injected at an advancing side of a compression top dead center, and a main injection in which fuel is injected during combustion of the fuel injected by the pre-injection, and the fuel injection controlling module sets fuel injection timings of the pre-injection and the main injection so that an interval between a first peak of heat release rate resulting from the combustion of the fuel injected by the pre-injection and a second peak of the heat release rate resulting from the combustion of fuel injected by the main injection becomes an interval to make pressure waves caused by the combustion of the fuel of the pre-injection and the main injection cancel each other out. When a decrease of the intake air temperature is detected by the intake-air-temperature sensor, the fuel injection controlling module controls the injector to increase the injection amount of the pre-injection and advance the injection timing of the pre-injection compared with a case where the decrease of the intake air temperature is not detected under a condition that an engine load and an engine speed are the same.

According to this configuration, similar to the first aspect described above, the sound pressure level of the combustion noise caused by the pre-injection and the main injection can be effectively reduced by the mutual interference, and the highly silent combustion where combustion noise is fully controlled can be realized.

Moreover, since the injection amount of the pre-injection is increased and the injection timing of the pre-injection is advanced when the intake air temperature decreases, the deviation of the first peak caused by the decrease of the intake air temperature can be corrected, thereby preventing beforehand the increase in combustion noise which may be caused by the deviation.

In detail, when the intake air temperature decreases, while the occurring timing of the first peak is moved to a retarding side of the target value (i.e., the timing at which the interval to the second peak becomes the expected interval), the height of the first peak becomes lower than the target value. On the other hand, since in this configuration the injection amount of the pre-injection is increased and the injection timing is advanced when the decrease of the intake air temperature is detected, the deviation of the first peak can be corrected, and while each of the heights of the first peak and the second peak is brought near the target values, the interval between the peaks can be maintained at the interval described above which is advantageous in terms of combustion noise. As a result, combustion noise can fully be reduced regardless of the decrease in the intake air temperature, thereby effectively improving the market value of the engine.

When the decrease of the intake air temperature is detected, the fuel injection controlling module may estimate a retarded deviation that is an amount by which the occurring timing of the first peak is shifted to the retarding side from a target timing due to the decrease of the intake air temperature, and set an increasing amount of the injection amount of the pre-injection so that the occurring timing of the first peak is advanced more than the estimated retarded deviation.

Moreover, when the decrease of the intake air temperature is detected, the fuel injection controlling module may estimate an extended deviation that is an amount by which a height of the first peak is increased from a target height due to the injection amount of the pre-injection being increased by the set increasing amount, and set an advancing amount of the injection timing of the pre-injection so that the height of the first peak decreases by an amount corresponding to the estimated extended deviation.

According to these configurations, the increasing amount and the advancing amount of the pre-injection can be calculated appropriately by the calculation so that the final occurring timing and the final height of the first peak which are achieved by the combination of increasing of the amount of the pre-injection and advancing of the pre-injection are brought near the target values, thereby fully reducing combustion noise.

The fuel injection controlling module may perform a plurality of divided injections of the pre-injection when the advancing amount of the injection timing of the pre-injection is calculated as a large value so that the pre-injection is started at the advancing side of a given crank angle.

According to this configuration, while the fuel injected by the pre-injection is fed to the suitable position inside the combustion chamber (e.g., inside a cavity formed in a crown surface of a piston), two injections which are temporally divided are performed as the pre-injection so that a penetration of fuel becomes weaker. Therefore, during the period from the start of the injection to the ignition, homogenization of a mixture gas inside the combustion chamber can be facilitated, thereby acquiring the same effect as if the injection timing is advanced. Thus, while clean combustion in which the air utilization of fuel is fully secured can be realized, the deviation of the first peak can be corrected appropriately and combustion noise can be reduced.

The fuel injection timing of the pre-injection may be set at a timing advanced from the compression top dead center by a given amount so that the fuel injected by the pre-injection carries out premixed compression ignition combustion. An estimation to estimate a heat-release characteristic may be performed based on setting values of the injection timing of the pre-injection and the injection amount of the pre-injection. The main injection may be started during a combustion period of the fuel injected by the pre-injection and at the retarding side of a crank angle at which the first peak estimated by the estimation occurs so that the fuel injected by the main injection carries out diffuse combustion.

According to this configuration, since the mode of combustion by the main injection which causes the second peak is the diffuse combustion in which the period from the start of the injection to the ignition (ignition delay period) is difficult to be influenced by environmental factors, the occurring timing of the second peak can be found definitely from the injection timing of the main injection. Thus, by adjusting the injection amount and/or the injection timing of the pre-injection while fixing the injection timing of the main injection, the interval between the first peak and the second peak can be brought into the expected interval (the interval at which the combustion pressure waves cancel each other out) with sufficient accuracy, thereby stably securing the noise control effect.

BRIEF DESCRIPTION OF DRAWINGS

FIG. 11A is a graph illustrating a peak delay of an early-stage combustion resulting from pre-injection, FIG. 11B illustrates an estimating model equation of the peak delay, and FIG. 11C is a table illustrating a calibration result of the estimating model equation.

FIG. 13A illustrates an estimating model equation of a peak height of the early-stage combustion, and FIG. 13B is a table illustrating a calibration result of the estimating model equation.

FIG. 21 is a graph illustrating one modification of the embodiment, where Chart (A) is a time chart illustrating an injection pattern when the injection timing of the pre-injection has not reached an advancing limit, and Chart (B) is a time chart illustrating an injection pattern when the injection timing of the pre-injection reaches the advancing limit.

DETAILED DESCRIPTION OF THE DISCLOSURE

[Overall Configuration of Engine]

Figure 1:
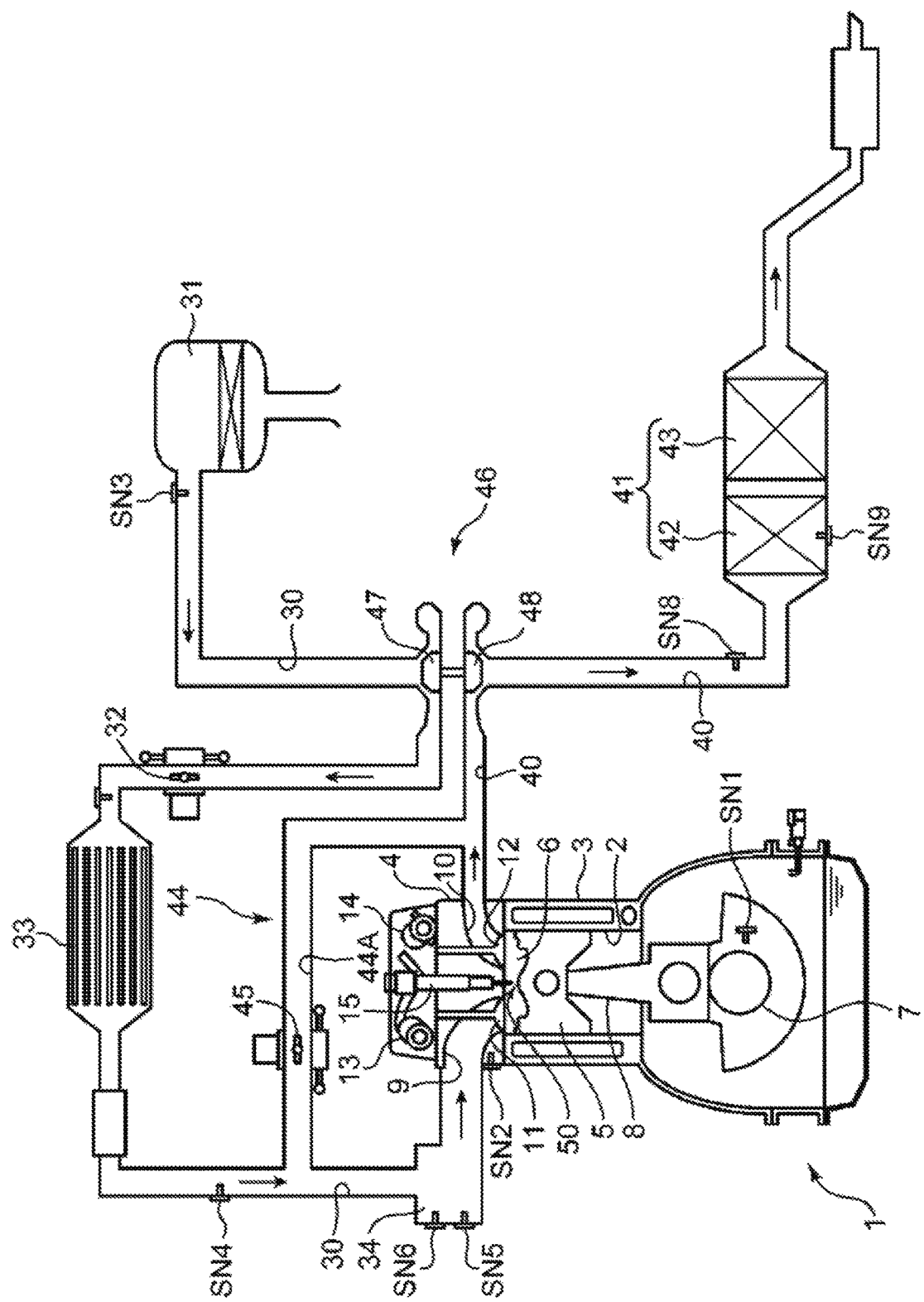
FIG. 1 is a system diagram of a diesel engine to which a control device according to the present disclosure is applied.

Hereinafter, one embodiment of a control device for a compression ignition engine according to the present disclosure will be described in detail with reference to the accompanying drawings. FIG. 1 is a system diagram illustrating the overall configuration of a diesel engine to which the control device according to the present disclosure is applied. The diesel engine illustrated in FIG. 1 is a four-cycle diesel engine mounted on a vehicle, as a propelling power source. The diesel engine includes an engine body 1 having a plurality of cylinders 2 and driven by being supplied fuel of which the main component is diesel fuel, an intake passage 30 where intake air introduced into the engine body 1 circulates, an exhaust passage 40 where exhaust gas discharged from the engine body 1 circulates, an exhaust gas recirculation (EGR) device 44 which recirculates to the intake passage 30 a portion of exhaust gas which circulates the exhaust passage 40, and a turbocharger 46 driven by exhaust gas which passes through the exhaust passage 40.

The engine body 1 is an engine which has the plurality of cylinders 2 lined up in a direction perpendicular to the drawing sheet of FIG. 1 (only one of them is illustrated in FIG. 1). The engine body 1 includes a cylinder block 3, a cylinder head 4, and pistons 5. The cylinder block 3 has a cylinder liner which forms the cylinder 2. The cylinder head 4 is attached to an upper surface of the cylinder block 3, and covers top openings of the cylinders 2. Each piston 5 is accommodated inside the corresponding cylinder 2 so as to be reciprocatable, and is coupled to a crankshaft 7 through a connecting rod 8. The crankshaft 7 rotates on its center axis according to the reciprocating motion of the piston 5. The structure of the piston 5 will be described in full detail later.

A combustion chamber 6 is formed above each piston 5. Each combustion chamber 6 is formed by a lower surface of the cylinder head 4 (a combustion-chamber ceiling surface 6U, refer to FIGS. 3 and 4), the cylinder 2, and a crown surface 50 of the piston 5. The fuel is supplied to the combustion chamber 6 by an injection from an injector 15 (described later). A mixture gas of the supplied fuel and air combusts inside the combustion chamber 6, and the piston 5, which is depressed by an expansion force caused by the combustion, reciprocates in the up-and-down direction.

A crank angle sensor SN1 and a water temperature sensor SN2 are attached to the cylinder block 3. The crank angle sensor SN1 detects a rotation angle of the crankshaft 7 (crank angle), and an engine speed of the crankshaft 7. The water temperature sensor SN2 detects the temperature of cooling water (engine water temperature) which circulates the inside of the cylinder block 3 and the cylinder head 4.

Intake ports 9 and exhaust ports 10 which communicate with each combustion chamber 6 are formed in the cylinder head 4. An intake-side opening which is a downstream end of the intake port 9 and an exhaust-side opening which is an upstream end of the exhaust port 10 are formed in the lower surface of the cylinder head 4. An intake valve 11 which opens and closes the intake-side opening and an exhaust valve 12 which opens and closes the exhaust-side opening are attached to the cylinder head 4. Note that although illustration is omitted, the engine body 1 is four-valve type comprised of two intake valves and two exhaust valves. Two intake ports 9 and two exhaust ports 10 are formed per cylinder 2, and two intake valves 11 and two exhaust valves 12 are also formed per cylinder 2.

An intake-side valve operating mechanism 13 and an exhaust-side valve operating mechanism 14 each including a cam shaft are disposed in the cylinder head 4. The intake valves 11 and the exhaust valves 12 are driven to open and close by the valve operating mechanisms 13 and 14, respectively, in an interlocked manner with the rotation of the crankshaft 7. An intake VVT 13a which can change the opening-and-closing timings of the intake valves 11 is built in the intake-side valve operating mechanism 13, and an exhaust VVT 14a which can change the opening-and-closing timings of the exhaust valves 12 is built in the exhaust-side valve operating mechanism 14 (refer to FIG. 7).

Figure 3:
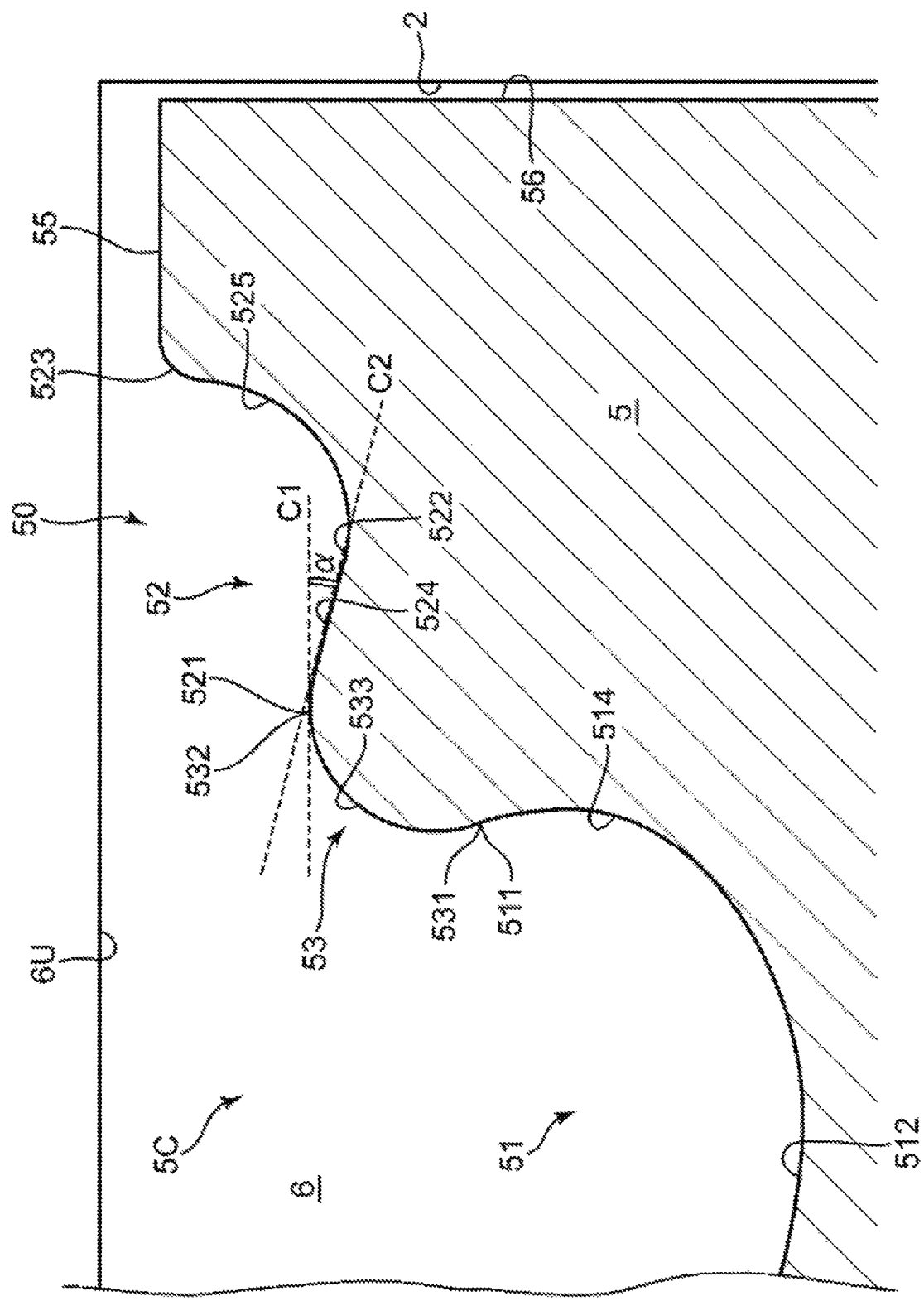
FIG. 3 is an enlarged view of the piston cross-section illustrated in FIG. 2B.
Figure 4:
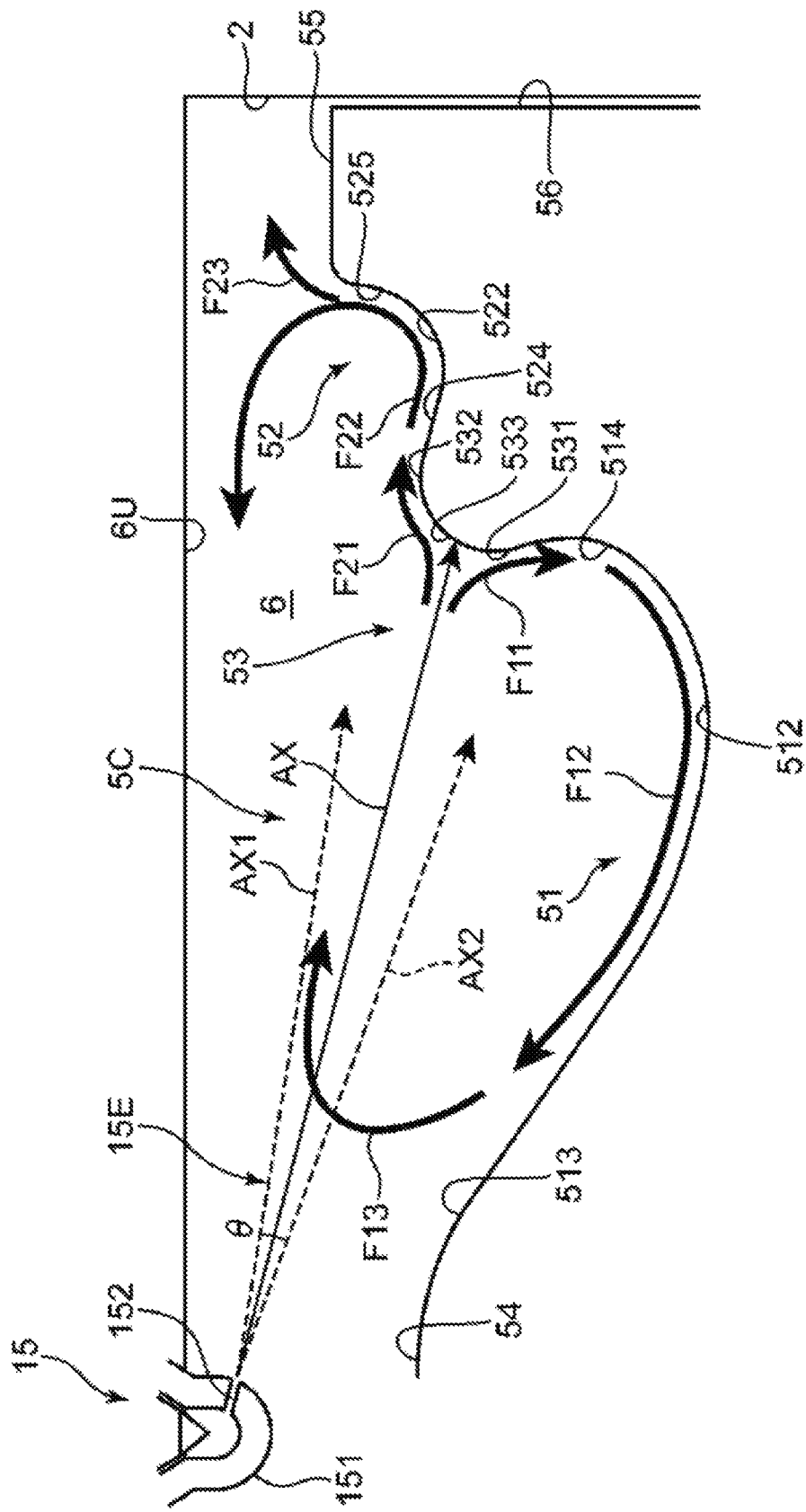
FIG. 4 is cross-sectional view of the piston illustrating a relationship between a crown surface of the piston and an injection axis of fuel by an injector.

One injector 15 which injects the fuel into the combustion chamber 6 from a tip-end part thereof is attached to the cylinder head 4 per cylinder 2. The injector 15 is a fuel injection valve which injects the fuel supplied through a fuel feed pipe (not illustrated) into the combustion chamber 6. The injector 15 is attached to the cylinder head 4 so that the tip-end part from which the fuel is injected (a nozzle 151; FIG. 4) is located at or near the radial center of the combustion chamber 6, and injects the fuel toward a cavity 5C (described later; refer to FIGS. 2A to 4) formed in the crown surface 50 of the piston 5.

The injector 15 is connected through the fuel feed pipe with a common rail (not illustrated) for accumulating pressure which is common to all the cylinders 2. In the common rail, high-pressure fuel which is pressurized by a fuel feed pump (outside the figure) is stored. By supplying the fuel of which the pressure is accumulated inside the common rail to the injector 15 of each cylinder 2, the fuel is injected from each injector 15 into the combustion chamber 6 at high pressure (e.g., about 150 MPa to 250 MPa).

Although not illustrated in FIG. 1, a fuel pressure regulator 16 (FIG. 7) which changes the pressure of the fuel (fuel pressure) supplied to the injector 15 is provided between the fuel feed pump and the common rail. Moreover, an injection pressure sensor SN7 (FIG. 7) which detects an injection pressure which is an injection pressure of the fuel from the injector 15 is provided inside the injector 15.

The intake passage 30 is connected to one side surface of the cylinder head 4 so as to communicate with the intake ports 9. Air (fresh air) taken in from the upstream end of the intake passage 30 is introduced into the combustion chambers 6 through the intake passage 30 and the intake ports 9. An air cleaner 31, the turbocharger 46, a throttle valve 32, an intercooler 33, and a surge tank 34 are disposed in the intake passage 30, in this order from upstream side.

The air cleaner 31 removes foreign substances contained in the intake air and purifies the intake air. The throttle valve 32 interlocks with a step-on operation of an accelerator pedal (not illustrated) to open and close the intake passage 30 so that a flow rate of intake air inside the intake passage 30 is adjusted. The turbocharger 46 pumps the intake air to downstream side of the intake passage 30, while compressing the intake air. Then intercooler 33 cools the intake air compressed by the turbocharger 46. The surge tank 34 is a tank which is disposed immediately upstream of an intake manifold which continues from the intake port 9, and provides a space for equally distributing the intake air to the plurality of cylinders 2.

An airflow sensor SN3, an intake-air-temperature sensor SN4, an intake pressure sensor SN5, and an intake $O_2$ sensor SN6 are disposed in the intake passage 30. The airflow sensor SN3 is disposed at downstream side of the air cleaner 31, and detects a flow rate of intake air which passes through this portion. The intake-air-temperature sensor SN4 is disposed at downstream side of the intercooler 33 (in detail, between the intercooler 33 and the surge tank 34), and detects a temperature of intake air which passes through this portion. The intake pressure sensor SN5 and the intake $O_2$ sensor SN6 are disposed at the surge tank 34, and they detect a pressure of intake air and an oxygen concentration of the intake air which passes through the surge tank 34, respectively.

The exhaust passage 40 is connected to the other side surface of the cylinder head 4 so as to communicate with the exhaust port 10. Burnt gas (exhaust gas) generated inside the combustion chamber 6 is discharged to the exterior of the vehicle through the exhaust ports 10 and the exhaust passage 40.

An exhaust $O_2$ sensor SN8 is disposed at the exhaust passage 40. The exhaust $O_2$ sensor SN8 is disposed between the turbocharger 46 and an exhaust emission control device 41, and detects an oxygen concentration of exhaust gas which passes through this portion.

The exhaust emission control device 41 is provided to the exhaust passage 40. An oxidation catalyst 42 which oxidizes and detoxicates hazardous components (CO and HC) contained in exhaust gas, and a DPF (diesel particulate filter) 43 which captures particulate matter contained in the exhaust gas are built in the exhaust emission control device 41. Note that a $NO_x$ catalyst which reduces and detoxicates $NO_x$ may be provided to the exhaust passage 40, at a position downstream of the exhaust emission control device 41.

A catalyst temperature sensor SN9 is provided to the exhaust emission control device 41. The catalyst temperature sensor SN9 detects a temperature of a catalyst inside the exhaust emission control device 41 (here, particularly a temperature of the oxidation catalyst 42).

The EGR device 44 includes an EGR passage 44A which connects the exhaust passage 40 with the intake passage 30, and an EGR valve 45 provided to the EGR passage 44A. The EGR valve 45 adjusts a flow rate of exhaust gas which recirculates from the exhaust passage 40 to the intake passage 30 through the EGR passage 44A (EGR gas). The EGR passage 44A connects a portion of the exhaust passage 40 upstream of the turbocharger 46 with a portion of the intake passage 30 between the intercooler 33 and the surge tank 34. An EGR cooler (not illustrated) which cools EGR gas by a heat exchange is disposed at the EGR passage 44A. Note that the intake-air-temperature sensor SN4 described above is disposed upstream of a connection between the EGR passage 44A and the intake passage 30, and detects a temperature of intake air before the EGR gas is mixed therewith.

The turbocharger 46 includes a compressor 47 disposed at the intake passage 30, and a turbine 48 disposed at the exhaust passage 40. The compressor 47 and the turbine 48 are coupled to each other so as to be integrally rotatable with a turbine shaft. The turbine 48 rotates when it receives energy of the exhaust gas that flows through the exhaust passage 40. By the compressor 47 rotating in an interlocked manner with the rotation of the turbine 48, air which circulates the intake passage 30 is compressed (supercharged or boosted).

[Detailed Structure of Piston]

Figure 2A:
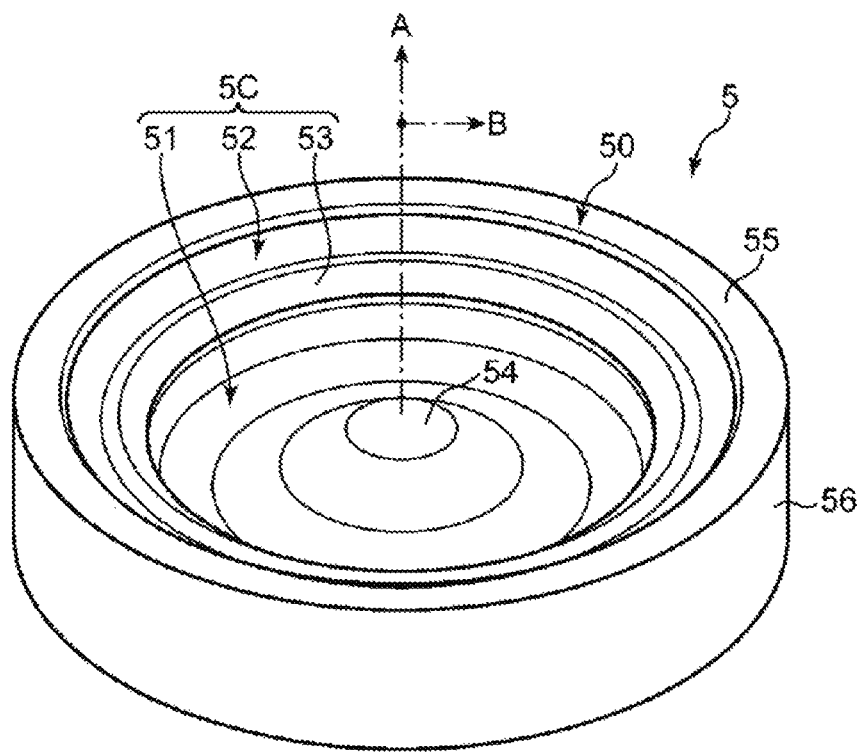
FIG. 2A is a perspective view of a crown surface part of a piston of the diesel engine illustrated in FIG. 1.
Figure 2B:
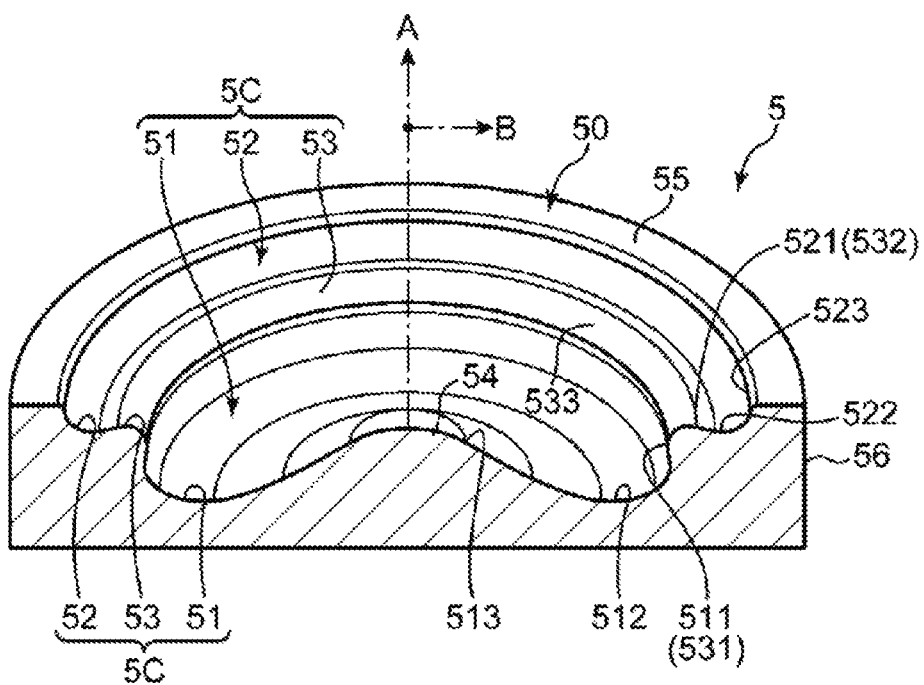
FIG. 2B is a perspective view of the piston with a cross-section.

Next, a structure of the piston 5, especially a structure of the crown surface 50 is described in detail. FIG. 2A is a perspective view mainly illustrating an upper part of the piston 5. Although the piston 5 includes a piston head at the upper side, and a skirt part located at a lower side, FIG. 2A illustrates the piston head portion having the crown surface 50 in the top surface. FIG. 2B is a perspective view with a radial direction cross-section of the piston 5. FIG. 3 is an enlargement of the radial direction cross-section illustrated in FIG. 2B. Note that in FIGS. 2A and 2B, a cylinder axis direction A, and a radial direction B of the combustion chamber are illustrated by arrows.

The piston 5 includes the cavity 5C, a perimeter edge plane part 55, and a side circumferential surface 56. As described above, a part of a combustion-chamber wall surface (bottom surface) which defines the combustion chamber 6 is formed by the crown surface 50 of the piston 5, and this crown surface 50 is provided to the cavity 5C. The cavity 5C is a portion where the crown surface 50 is dented downwardly in the cylinder axis direction A, and is a portion which receives the injection of fuel from the injector 15. The perimeter edge plane part 55 is an annular plane part disposed at an area near the perimeter edge of the crown surface 50 in the radial direction B. The cavity 5C is disposed in a center range of the crown surface 50 in the radial direction B, except for the perimeter edge plane part 55. The side circumferential surface 56 is a surface which slidably contacts an inner wall surface of the cylinder 2, where a plurality of ring grooves into which piston rings (not illustrated) are fitted are formed.

The cavity 5C includes a first cavity part 51, a second cavity part 52, a coupling part 53, and a mountain part 54. The first cavity part 51 is a recess disposed in the center range of the crown surface 50 in the radial direction B. The second cavity part 52 is an annular recess disposed at the perimeter side of the first cavity part 51 in the crown surface 50. The coupling part 53 is a portion which couples the first cavity part 51 to the second cavity part 52 in the radial direction B. The mountain part 54 is a mountain-shaped convex part disposed at a center position of the crown surface 50 (first cavity part 51) in the radial direction B. The mountain part 54 protrudes at a position directly below the nozzle 151 of the injector 15 (FIG. 4).

The first cavity part 51 includes a first top end part 511, a first bottom part 512, and a first inner end part 513. The first top end part 511 is located at the highest position in the first cavity part 51, and continues to the coupling part 53. The first bottom part 512 is an annular area in a plan view which is dented most in the first cavity part 51. As the entire cavity 5C, the first bottom part 512 is also the deepest part, and the first cavity part 51 has a given depth (first depth) in the cylinder axis direction A at the first bottom part 512. In the plan view, the first bottom part 512 is located at a position inwardly proximate to the coupling part 53 in the radial direction B.

The first top end part 511 and the first bottom part 512 are connected by a radially dented part 514 which curves outwardly in the radial direction B. The radially dented part 514 has a portion which is dented in the radial direction B outwardly from the coupling part 53. The first inner end part 513 is located at a most radially inward position in the first cavity part 51, and continues to a lower end of the mountain part 54. The first inner end part 513 and the first bottom part 512 are connected by a curved surface which curves gently in a skirt shape.

The second cavity part 52 includes a second inner end part 521, a second bottom part 522, a second top end part 523, and a taper area 524, and a standing wall area 525. The second inner end part 521 is located at the most radially inward position in the second cavity part 52, and continues to the coupling part 53. The second bottom part 522 is an area which is dented most in the second cavity part 52. The second cavity part 52 has a depth shallower than the first bottom part 512 in the cylinder axis direction A at the second bottom part 522. That is, the second cavity part 52 is a recess located above the first cavity part 51 in the cylinder axis direction A. The second top end part 523 is located at the highest position in the second cavity part 52, is located most radially outward, and continues to the perimeter edge plane part 55.

The taper area 524 is a portion which extends toward the second bottom part 522 from the second inner end part 521, and has a surface shape which declines toward the radially outward. As illustrated in FIG. 3, the taper area 524 has an inclination along an inclination line C2 which intersects at an inclination angle α to a horizontal line C1 extending in the radial direction B.

The standing wall area 525 is a wall surface formed so as to rise comparatively steeply at a radially outward location of the second bottom part 522. In the cross-sectional shape in the radial direction B, the wall surface of the second cavity part 52 is formed in a curved surface so that it curves upwardly from the horizontal direction from the second bottom part 522 to the second top end part 523, and a portion which is a wall surface nearly a vertical wall near the second top end part 523 is the standing wall area 525. A lower part of the standing wall area 525 is located inwardly in the radial direction B from the upper end position of the standing wall area 525. Therefore, the mixture gas is kept from excessively returning to the inside in the radial direction B of the combustion chamber 6, and combustion which also effectively uses air existing in a space radially outward of the standing wall area 525 (squish space) is enabled.

The coupling part 53 has a bump or swelling shape which projects radially inward in the cross section in the radial direction B between the first cavity part 51 located below and the second cavity part 52 located above. The coupling part 53 has a lower end part 531, a third top end part 532 (an upstream end part in the cylinder axis direction), and a central part 533 located at the center between the parts. The lower end part 531 is a coupling part to the first top end part 511 of the first cavity part 51. The third top end part 532 is a coupling part to the second inner end part 521 of the second cavity part 52.

In the cylinder axis direction A, the lower end part 531 is a portion located at a lower most position, and the third top end part 532 is a portion located at an upper most position in the coupling part 53. The taper area 524 is also an area which extends toward the second bottom part 522 from the third top end part 532. The second bottom part 522 is located below the third top end part 532. That is, the second cavity part 52 of this embodiment does not have a bottom surface which extends from the third top end part 532 in the horizontal direction outward in the radial direction B, in other words, the part from the third top end part 532 to the perimeter edge plane part 55 is not connected by the horizontal surface, but has the second bottom part 522 dented below the third top end part 532.

Although the mountain part 54 projects upwardly, its projected height is the same as the height of the third top end part 532 of the coupling part 53, and is located at a position dented more than the perimeter edge plane part 55. The mountain part 54 is located at the center of the circular first cavity part 51 in the plan view, and thereby, the first cavity part 51 is an annular groove formed around the mountain part 54.

[Spatial Separation of Fuel Injection]

Next, a fuel injection state to the cavity 5C by the injector 15 and a flow of the mixture gas after the injection are described with reference to FIG. 4. FIG. 4 is a simplified cross-sectional view of the combustion chamber 6, and illustrates a relationship between the crown surface 50 (cavity 5C) and an injection axis AX of an injected fuel 15E from the injector 15, arrows F11, F12, F13, F21, F22, and F23 schematically indicating flows of the mixture gas after the injection.

The injector 15 is provided with the nozzle 151 disposed so as to project downwardly from the combustion-chamber ceiling surface 6U (the lower surface of the cylinder head 4) to the combustion chamber 6. The nozzle 151 is provided with an injection hole 152 from which fuel is injected into the combustion chamber 6. In FIG. 4, one injection hole 152 is illustrated. However, in practice, a plurality of injection holes 152 are formed at an equal pitch in the circumferential direction of the nozzle 151. The fuel injected from the injection hole 152 is injected along the injection axis AX in this figure. The injected fuel spreads with a spray angle θ. In FIG. 4, an upper spreading axis AX1 indicative of spreading upward with respect to the injection axis AX, and a lower spreading axis AX2 indicative of spreading downward are illustrated. The spray angle θ is an angle formed by the upper spreading axis AX1 and the lower spreading axis AX2.

The injection hole 152 can inject fuel toward the coupling part 53 of the cavity 5C. That is, the injection axis AX can be directed to the coupling part 53 by causing the fuel-injecting operation to perform from the injection hole 152 at a given crank angle of the piston 5. FIG. 4 illustrates a spatial relationship between the injection axis AX and the cavity 5C at the given crank angle. The fuel injected from the injection hole 152 hits the coupling part 53, while being mixed with air inside the combustion chamber 6 to form the mixture gas.

As illustrated in FIG. 4, the fuel 15E injected toward the coupling part 53 along the injection axis AX collides with the coupling part 53, and is then spatially divided into fuel which goes toward the first cavity part 51 (downward) (arrow F11), and fuel which goes toward the second cavity part 52 (upward) (arrow F21). That is, the fuel injected toward the central part 533 of the coupling part 53 is divided vertically, and the divided flows then flow along the surface shapes of the cavity parts 51 and 52, while being mixed with air which exists in the first and second cavity parts 51 and 52, respectively.

In detail, the mixture gas which goes in a direction of the arrow F11 (downward) enters into the radially dented part 514 of the first cavity part 51 from the lower end part 531 of the coupling part 53, and flows downwardly. Then, the mixture gas changes its flow direction from downward to an inward direction in the radial direction B by the curved shape of the radially dented part 514, and as illustrated by the arrow F12, it flows along the bottom shape of the first cavity part 51 which has the first bottom part 512. Here, the mixture gas is mixed with air in the first cavity part 51 so that the concentration becomes leaner. By the existence of the mountain part 54, the bottom surface of the first cavity part 51 has a shape which rises toward the center in the radial direction. Therefore, the mixture gas which flows in the direction of the arrow F12 is raised up, and as illustrated by an arrow F13, it finally flows radially outward from the combustion-chamber ceiling surface 6U. Also, in such a flow, the mixture gas is mixed with air which remains inside the combustion chamber 6, and becomes a homogeneous and lean mixture gas.

On the other hand, the mixture gas which goes in a direction of the arrow F21 (upward) enters into the taper area 524 of the second cavity part 52 from the third top end part 532 of the coupling part 53, and goes obliquely downward along the inclination of the taper area 524. Then, as illustrated by the arrow F22, the mixture gas reaches the second bottom part 522. Here, the taper area 524 is a surface with an inclination along the injection axis AX. Therefore, the mixture gas can smoothly flow radially outward. That is, the mixture gas can reach a deep radially outward position of the combustion chamber 6 by the existence of the taper area 524 and the existence of the second bottom part 522 located below the third top end part 532 of the coupling part 53.

After that, the mixture gas is raised up by the standup curved surface between the second bottom part 522 and the standing wall area 525, and flows radially inward from the combustion-chamber ceiling surface 6U. In such a flow illustrated by the arrow F22, the mixture gas is mixed with air in the second cavity part 52, and becomes the homogeneous and lean mixture gas. Here, the injected fuel (mixture gas) is prevented from reaching an inner circumferential wall (the liner (not illustrated) generally exists) of the cylinder 2, because the standing wall area 525 extending substantially vertically exists radially outward of the second bottom part 522. That is, although the mixture gas can flow to near radially outward of the combustion chamber 6 by the formation of the second bottom part 522, the interference with the inner circumferential wall of the cylinder 2 is prevented by the existence of the standing wall area 525. Therefore, the cooling loss due to the interference can be reduced.

Here, the standing wall area 525 has a shape so that its lower part is located inward of the upper end position in the radial direction B. Thus, the flow illustrated by an arrow F22 does not become excessively intensive, and therefore, the mixture gas will not excessively return inward in the radial direction B. If the flow of the arrow F22 is too intensive, the mixture gas which combusts in part will collide with newly injected fuel before the fuel is fully dispersed, and therefore, the air utilization which is a rate of air used for a reaction with the fuel will fall, and soot will be generated. However, the standing wall area 525 of this embodiment is not provided with a shape which is scooped out in the radially outward direction, and therefore, the flow of the arrow F22 is restrained, and the radially outward flow in the radial direction B illustrated by the arrow F23 is also generated. Since the flow is pulled by a reverse squish flow especially in the second half of combustion, the flow of the arrow F23 tends to be generated. Therefore, the combustion which also effectively uses the air existing in the space (a squish space on the perimeter edge plane part 55) radially outward of the standing wall area 525 can be performed. Therefore, the combustion which reduces the generation of soot and excels in the emission performance utilizing the entire air inside the combustion-chamber 6 can be realized.

As described above, since the fuel injected toward the coupling part 53 along the injection axis AX collides with the coupling part 53 and is separated spatially, and the combustion utilizing the air existing in the respective spaces of the first and second cavity parts 51 and 52 (combustion of high air utilization) is realized, the generation of soot can be reduced during combustion.

[Temporal Separation of Fuel Injection]

Figure 5:
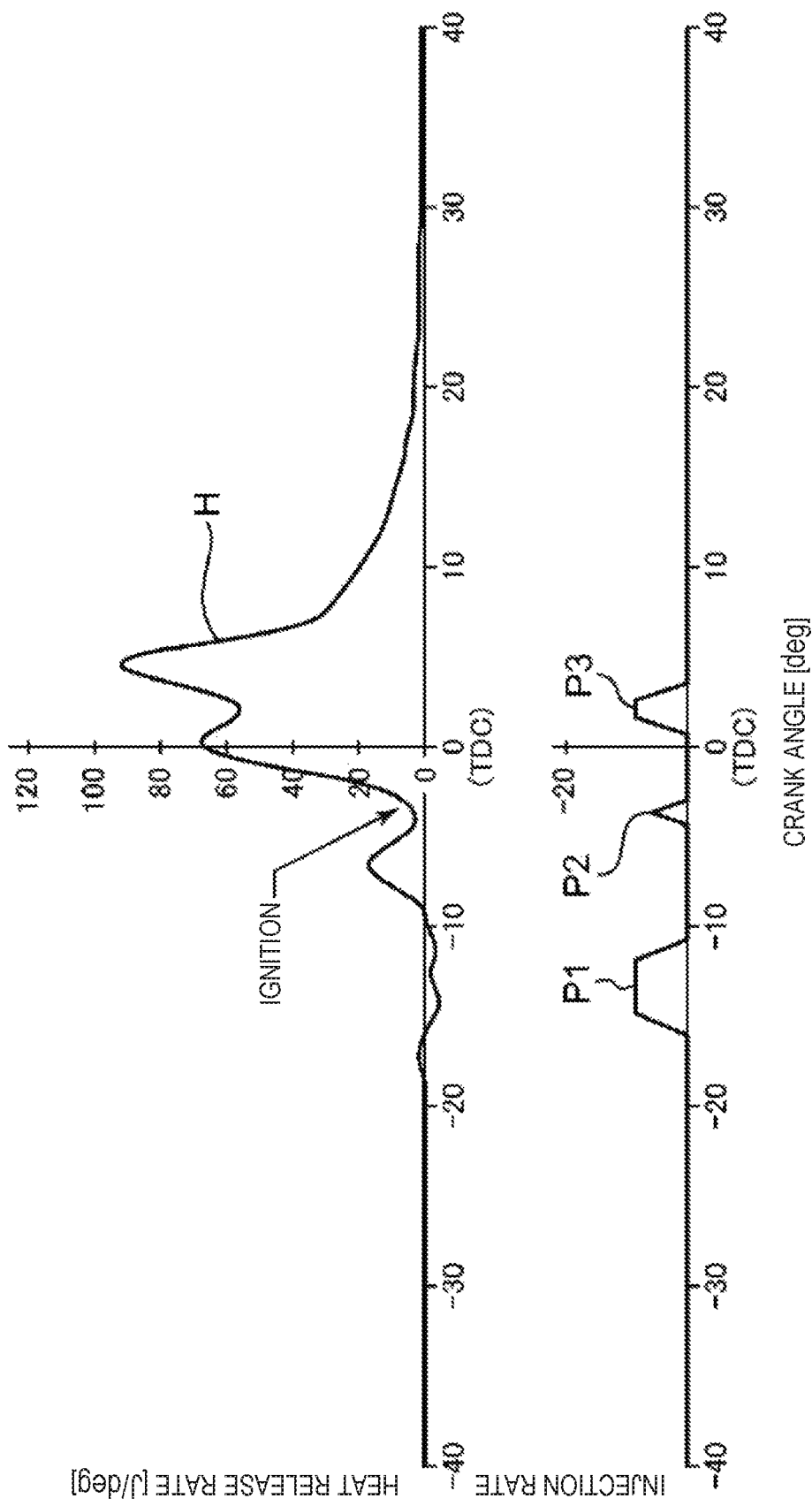
FIG. 5 is a time chart illustrating a timing of a fuel injection and a heat release rate.

In this embodiment, one example which utilizes the air inside the combustion chamber 6 more effectively by dividing or separating the fuel injection also in time, in addition to the spatial separation of the fuel injection described above, is illustrated. FIG. 5 is a time chart illustrating one example of an injection pattern when injecting fuel from the injector 15 to the cavity 5C, and a heat-release characteristic H which is a waveform of heat release rate generated by the fuel injection. In this embodiment, an operating range to which premixed compression ignition combustion (hereinafter, referred to as the "PCI combustion") is applied is defined beforehand, and the injection pattern illustrated in FIG. 5 is one example of the injection pattern which is selected for the operation in this operating range to which this PCI combustion is applied (hereinafter, referred to as the "PCI range"). The operation of the fuel injection by the injector 15 is controlled by a fuel injection controlling module 72 described above (refer to FIG. 7). The fuel injection controlling module 72 performs at least a pre-injection P1 which is early in the injection timing and a main injection P3 which is late in the injection timing in each engine combustion cycle during the operation in the PCI range. Note that in FIG. 5, the example in which a middle injection P2 is performed between the pre-injection P1 and the main injection P3 is illustrated.

The pre-injection P1 is a fuel injection performed at a timing earlier than a compression top dead center (TDC). FIG. 5 illustrates one example in which the pre-injection P1 are performed within a period from −20° C.A to −10° C.A. Note that "° C.A" indicates a crank angle, where the negative crank angle indicates a crank angle advanced from TDC and the positive crank angle indicates a crank angle retarded from TDC. The fuel injected by the pre-injection P1 at a timing earlier than TDC combusts by self-ignition after being fully mixed with air (PCI combustion). In other words, an advancing amount of the injection timing of the pre-injection P1 from TDC is set as a value so that the fuel injected by the pre-injection P1 carries out PCI combustion (premixed compression ignition combustion).

The main injection P3 is a fuel injection performed after the fuel injected by the pre-injection P1 is ignited (during combustion) and at the timing where the piston 5 is located near the compression top dead center (TDC). FIG. 5 illustrates one example in which the main injection P3 is started at a timing slightly retarded from TDC. In more detail, the start timing of the main injection P3 is set at the same timing or a timing retarded therefrom as a peak of the heat release rate resulting from combustion of fuel injected by the pre-injection P1 (PCI combustion), i.e., a peak formed near TDC in the heat-release characteristic H of FIG. 5 (corresponding to a first peak HAp of FIG. 9A described later). FIG. 5 illustrates one example in which the main injection P3 is started at a timing slightly retarded from the peak of the heat release rate by the PCI combustion (first peak). The fuel injected by the main injection P3 during PCI combustion results in the self-ignition within a very short period of time from the start of the injection. Such a combustion based on the main injection P3 becomes a diffuse combustion instead of PCI combustion.

In this embodiment, although the maximum fuel injection rate is the same for the pre-injection P1 and the main injection P3, the fuel injection period is set longer for the pre-injection P1. That is, in this embodiment, the injector 15 is controlled so that the injection amount of the pre-injection P1 becomes more than the injection amount of the main injection P3 in the PCI range.

The middle injection P2 injects a smaller amount of fuel than the injections P1 and P3, between the pre-injection P1 and the main injection P3. The middle injection P2 is performed in order to reduce a valley part between the peaks in the heat-release characteristic H (a valley part near 2 to 3° C.A) as much as possible to eliminate noise, but it is also possible to omit the middle injection P2.

Figure 6:
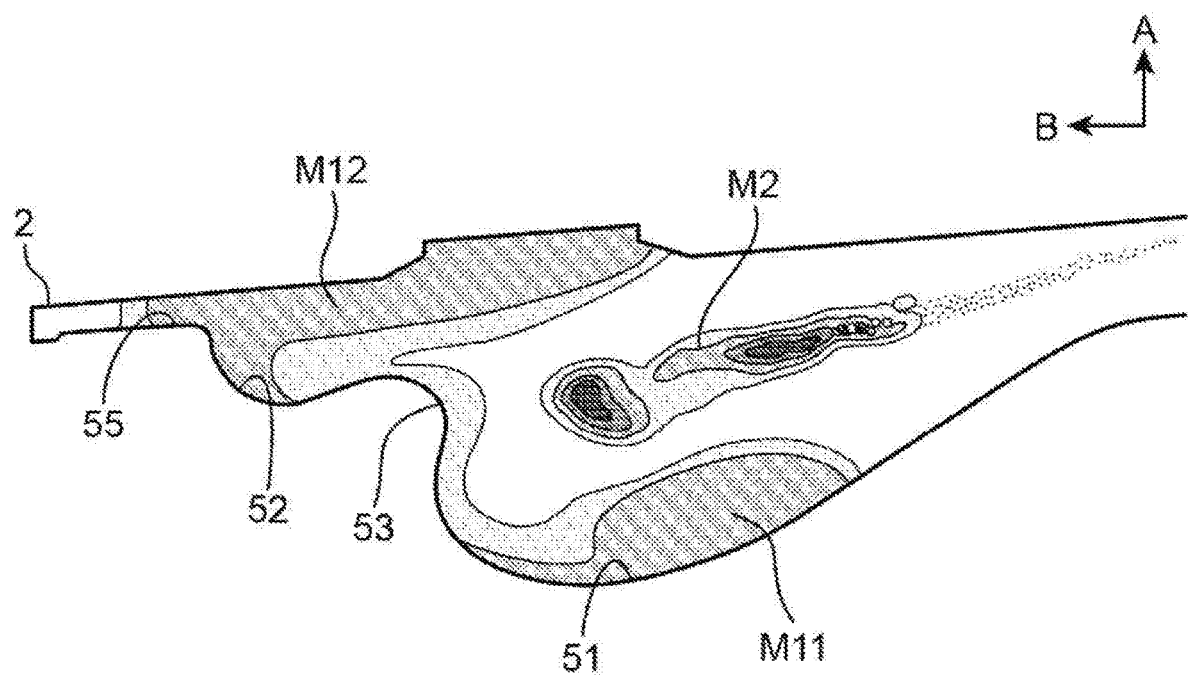
FIG. 6 is a view schematically illustrating a generated state of a mixture gas inside a combustion chamber.

Here, the fuel injection directed to the coupling part 53 described above is performed during the pre-injection P1. The main injection P3 is an injection injected between the upper and lower separated mixture gas, after the fuel injected by the pre-injection P1 (mixture gas) is spatially divided to the lower first cavity part 51 and the upper second cavity part 52. This is described with reference to FIG. 6. FIG. 6 is a view schematically illustrating a generated state of the mixture gas inside the combustion chamber 6 at a timing where the main injection P3 ends.

The injected fuel by the pre-injection P1 hits the coupling part 53, while being mixed with air inside the combustion chamber 6 and becoming the mixture gas. By hitting the coupling part 53, as illustrated in FIG. 6, the mixture gas is divided into a lower mixture gas M11 which goes toward the first cavity part 51 and an upper mixture gas M12 which goes toward the second cavity part 52. This is the spatial separation of the mixture gas described above. The main injection P3 is an injection performed in order to form a new mixture gas utilizing the air which remains in the space between the two separated mixture gases, after the fuel injected by the pre-injection P1 (mixture gas) enters into the spaces of the first and second cavity parts 51 and 52 and is separated spatially.

Description is added based on FIG. 6. Since the piston 5 is located approximately at the position of TDC at the execution timing of the main injection P3, the fuel of the main injection P3 will be injected to a position slightly lower than the coupling part 53. The lower mixture gas M11 and the upper mixture gas M12 of the pre-injection P1 injected first enter into the first cavity part 51 and the second cavity part 52, respectively, and they are mixed with air in the respective spaces, thereby being diluted. Immediately before the start of the main injection P3, it is a state where unused air (air which is not mixed with fuel) exists between the lower mixture gas M11 and the upper mixture gas M12. An egg shape of the first cavity part 51 contributes to a formation of such an unused air layer. The injected fuel of the main injection P3 enters into between the lower mixture gas M11 and the upper mixture gas M12, and it is mixed with air which is not used to become a second mixture gas M2. This is a temporal separation of the fuel injection. As described above, in this embodiment, the combustion which effectively utilizes the air existing inside the combustion chamber 6 can be realized by the spatial and temporal separations of the fuel injection.

[Control Configuration]

Figure 7:
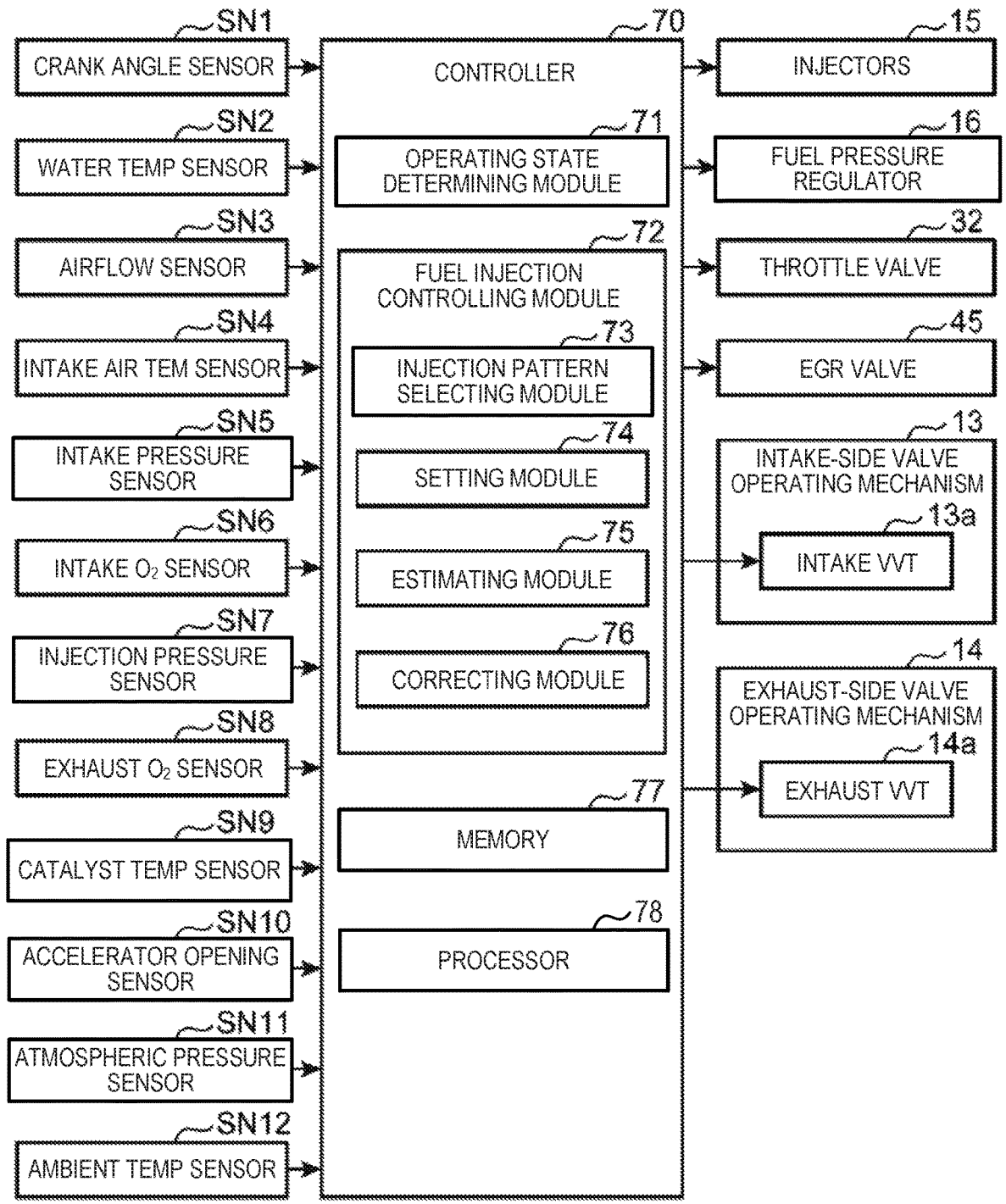
FIG. 7 is a block diagram illustrating a control system of the diesel engine.

FIG. 7 is a block diagram illustrating a control configuration of the diesel engine system. The engine system of this embodiment is comprehensively controlled by a controller 70. The controller 70 is comprised of a processor 78 (e.g., a central processing unit (CPU)) having associated ROM, RAM, etc. Detection signals are inputted into the controller 70 from various sensors mounted on the vehicle. In addition to the sensors SN1-SN9 described previously, the vehicle is also provided with an accelerator opening sensor SN10 which detects an accelerator opening which is an opening of the accelerator pedal operated by a driver who operates the vehicle, an atmospheric pressure sensor SN11 which measures pressure (atmospheric pressure) of air outside the vehicle, and an ambient temperature sensor SN12 which measures temperature of the air outside the vehicle (ambient temperature).

The controller 70 is electrically connected with the crank angle sensor SN1, the water temperature sensor SN2, the airflow sensor SN3, the intake-air-temperature sensor SN4, the intake pressure sensor SN5, the intake $O_2$ sensor SN6, the injection pressure sensor SN7, the exhaust $O_2$ sensor SN8, the catalyst temperature sensor SN9, the accelerator opening sensor SN10, the atmospheric pressure sensor SN11, and the ambient temperature sensor SN12, described above. Information detected by these sensors SN1-SN12, i.e., information on the crank angle, the engine speed, the engine water temperature, the intake air flow rate, the intake air temperature, the intake pressure, the intake air oxygen concentration, the fuel pressure (injection pressure of the injector 15), the exhaust oxygen concentration, the catalyst temperature, the accelerator opening, the atmospheric pressure, and the ambient temperature are sequentially inputted into the controller 70.

The controller 70 controls each part of the engine, while performing various determinations, calculations, etc. based on the input signals from the sensors SN1-SN12, etc. That is, the controller 70 is electrically connected with the intake VVT 13a, the exhaust VVT 14a, the injectors 15, the fuel pressure regulator 16, the throttle valve 32, and the EGR valve 45, etc., and outputs a control signal to each of the devices based on the result of calculation, etc.

The controller 70 executes software modules to achieve their respective functions, including an operating state determining module 71 and the fuel injection controlling module 72. These modules are stored in memory 77 as software.

The operating state determining module 71 is a module which determines the operating state of the engine based on an engine speed based on a detection value of the crank angle sensor SN1, an engine load based on a detection value of the accelerator opening sensor SN10 (valve opening information on the accelerator pedal), etc. For example, the operating state determining module 71 determines whether the current operating range of the engine is the PCI range where the pre-injection P1 and the main injection P3 described above are performed (the premixed compression ignition combustion is performed).

The fuel injection controlling module 72 is a control module which controls the injecting operation of fuel by the injector 15. When the engine is operated in the PCI range, the fuel injection controlling module 72 causes the injector 15 to perform a plurality of fuel injections at least including the pre-injection P1 which injects fuel at a given timing before a compression top dead center, and the main injection P3 which injects fuel at a timing where the piston 5 is located near the compression top dead center, for every engine combustion cycle.

Further, the fuel injection controlling module 72 is functionally provided with an injection pattern selecting module 73, a setting module 74, an estimating module 75, and a correcting module 76.

The injection pattern selecting module 73 sets the pattern of the fuel injection from the injector 15 according to various kinds of conditions. At least in the PCI range, the injection pattern selecting module 73 sets the pattern of the fuel injection including the pre-injection P1 and the main injection P3.

The setting module 74 sets the amount and the timing of the fuel injection from the injector 15 according to various kinds of conditions. For example, the setting module 74 controls the injector 15 so that the fuel injection amount increases as the engine load identified from the detection value of the accelerator opening sensor SN10 becomes higher (in other words, the accelerator opening increases). That is, on the high load condition where the accelerator opening is larger, since the high output torque is required for the engine, the setting module 74 increases the fuel injection amount per combustion cycle (if carrying out the divided injection of fuel, it is the total amount) so that the high amount of heat is generated corresponding to the demand torque.

Figure 8:
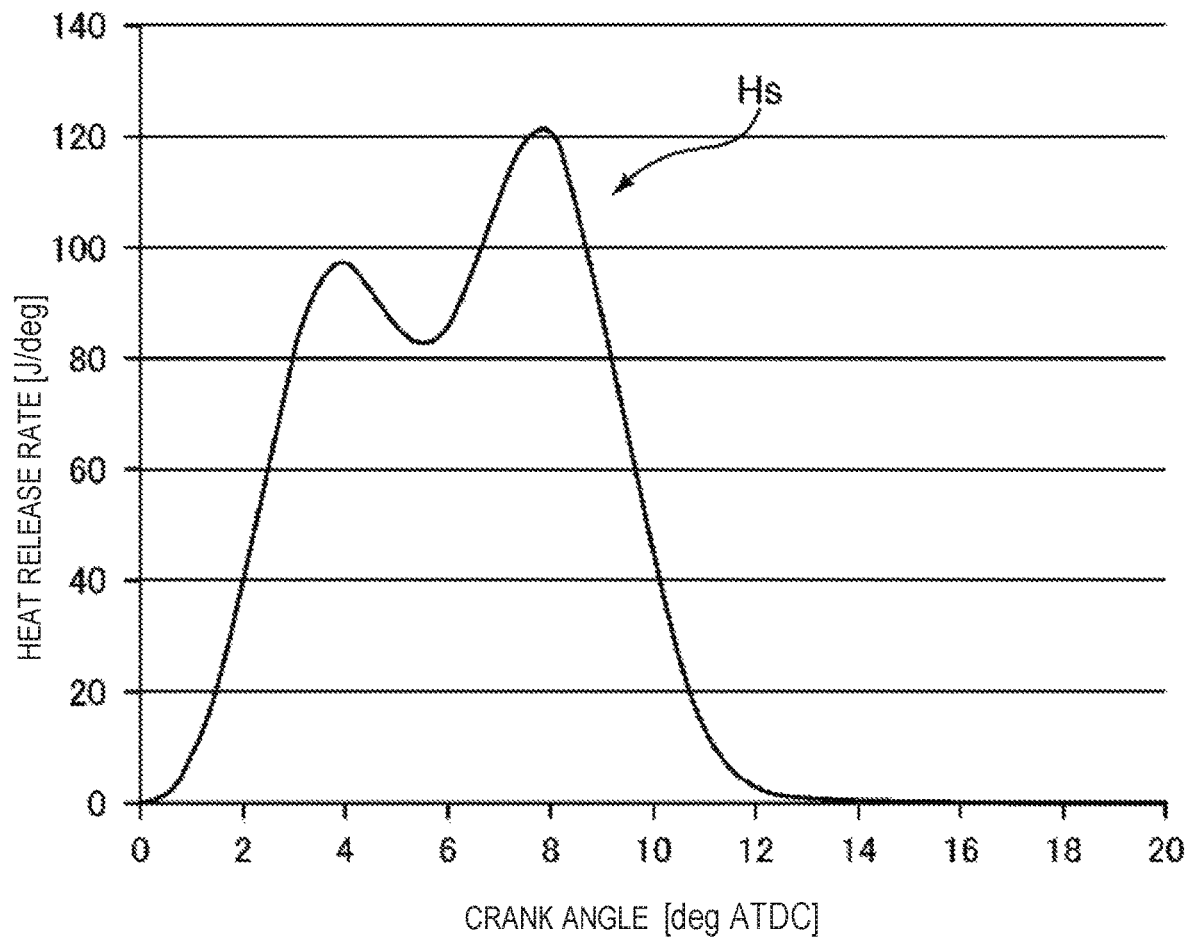
FIG. 8 is a graph illustrating one example of a target heat-release characteristic.

Moreover, in the PCI range, the setting module 74 sets the injection amount and the injection timing of fuel so that a target heat-release characteristic including the first peak which is a rise peak of the heat release rate inside the combustion chamber 6 accompanying the pre-injection P1, and a second peak which is a rise peak of the heat release rate inside the combustion chamber 6 accompanying the main injection P3 is acquired. One example of a target heat-release characteristic Hs is illustrated in FIG. 8. In the illustrated target heat-release characteristic Hs, the first peak appears near 4° C.A, and the second peak appears near 8° C.A.

Further, the setting module 74 sets the injection timings of the pre-injection P1 and the main injection P3 so that a peak interval between the timing when the first peak occurs and the timing when the second peak occurs becomes an interval so that a pressure wave resulting from combustion of fuel of the pre-injection P1 and a pressure wave resulting from combustion of fuel of the main injection P3 cancel each other out. Therefore, combustion noises generated by the pre-injection P1 and the main injection P3 cancels each other out to reduce combustion noises, such as diesel-knock sound, to a sufficiently low level. These will be described in full detail later.

During the operation in the PCI range in which at least the pre-injection P1 and the main injection P3 are performed, the ignition timing of fuel is mainly governed by the executing state of the pre-injection P1 which injects a comparatively large amount of fuel at the earliest timing. In other words, in the PCI range, if a mode of the pre-injection P1 is defined (the injection amount, the injection timing), the combustion accompanying the subsequent fuel injections (the middle injection P2 and the main injection P3) becomes comparatively high in the robustness. Therefore, in this embodiment, during the operation in the PCI range, the injection amount and the injection timing of the pre-injection P1 are primarily adjusted, and thereby, a height ratio of the first peak and the second peak is brought close with respect to the target value, and the interval between the first peak and the second peak is brought close with respect to the target value. Note that when the mode of the main injection P3 (injection amount and the injection timing) is primarily changed, the combustion period may be entirely shifted to affect fuel efficiency and torque.

The estimating module 75 estimates, during the operation in the PCI range, the heat-release characteristic caused under the current condition based on the injection amounts and the injection timings of the fuel injections (the pre-injection P1 and the main injection P3) set by the setting module 74 based on the target heat-release characteristic Hs, and given combustion environmental factors which affect the combustion inside the combustion chamber 6. For example, the estimating module 75 estimates based on the injection amount and the injection timing and the combustion environmental factors of the pre-injection P1 an occurring timing of the first peak which is the peak of the heat release rate produced accompanying the pre-injection P1, and the height of the first peak (peak value).

The estimating module 75 uses a given estimating model equation for this estimation (will be described later based on FIGS. 11A to 14B). The occurring timing and the height of the first peak may also be adjusted by a feedback control based on the detection results of the various sensors SN1-SN12. However, in the feedback control, the diesel-knock sound may actually occur to cause the driver uncomfortableness. Therefore, the estimating module 75 estimates the occurring timing and the height of the first peak by the feed-forward system using the estimating model equation, and estimates deviations of the occurring timing and the height which are estimated from the respective target values (i.e., the occurring timing and the height of the first peak which are identified in the target heat-release characteristic Hs).

The correcting module 76 corrects the injection amount or the injection timing of the pre-injection P1 which are set by the setting module 74, based on the occurring timing and the height of the first peak which are estimated by the estimating module 75. That is, the correcting module 76 corrects the injection amount or the injection timing of the pre-injection P1 so that the deviations of the estimated values of the occurring timing and the height of the first peak which are estimated by the estimating module 75 with reference to the combustion environmental factors from the corresponding values (target values) in the target heat-release characteristic Hs are canceled out. That is, before the diesel-knock sound occurs, the correction to cancel the deviations is performed.

The memory 77 stores the estimating model equation which is used when the estimating module 75 of the fuel injection controlling module 72 performs the given calculation. The estimating model equation is a formula to estimate changes in the occurring timing and the height of the first peak with respect to the target values (specified values of the target heat-release characteristic Hs) based on the given combustion environmental factors. Note that the combustion environmental factors are derived directly or indirectly from the measurement values of the sensors SN1-SN12, such as a wall surface temperature of the combustion chamber 6, an in-cylinder pressure, an in-cylinder gas temperature, an in-cylinder oxygen concentration, and an injection pressure.

[Two-Stage Heat Release Rate and Noise Cancellation]

Figure 9A:
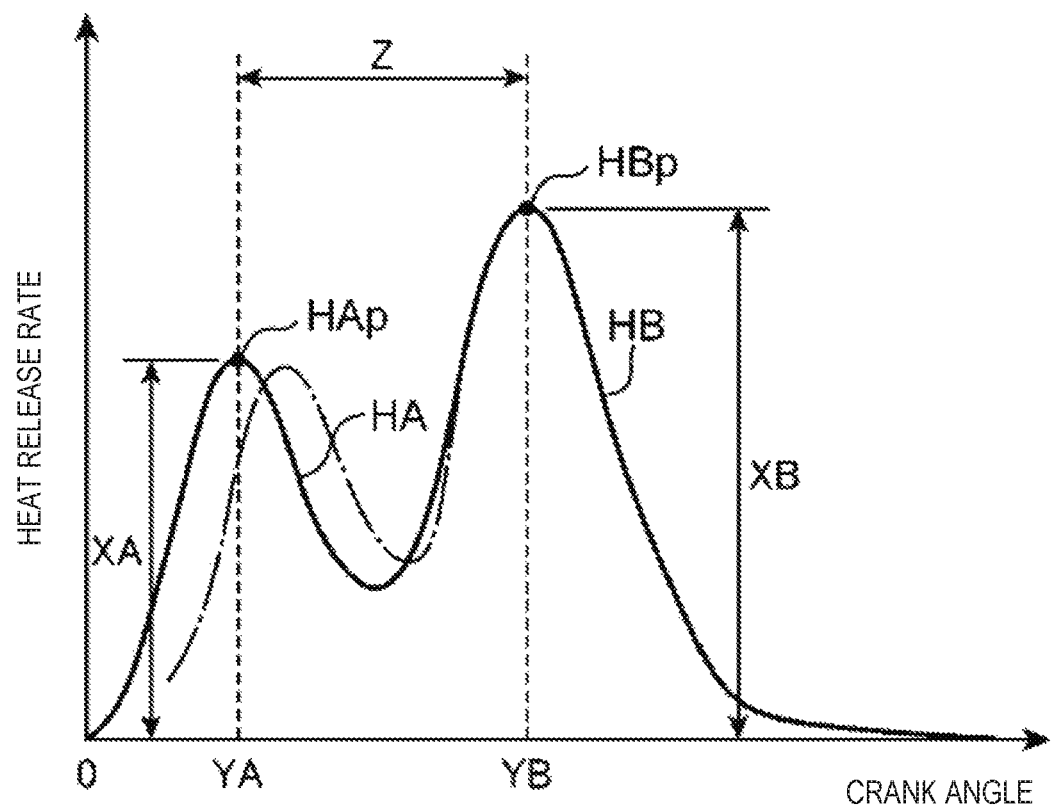
FIG. 9A is a graph schematically illustrating peaks of the heat release rate caused by the combustions by pre-injection and the main injection.

FIG. 9A is a view illustrating a waveform of the heat release rate caused by the combustions of the pre-injection P1 and the main injection P3. In FIG. 9A, the heat-release characteristic H illustrated in FIG. 5 is deformed somewhat so that the characteristic of the waveform becomes more intelligible.

The heat-release characteristic H has an early-stage combustion portion HA which is a waveform of the heat release rate produced accompanying the combustion of fuel injected by the pre-injection P1, and a late-stage combustion portion HB which is a waveform of the heat release rate produced accompanying the combustion of fuel injected by the main injection P3. The early-stage combustion portion HA and the late-stage combustion portion HB each has a mountain-shaped waveform, and they have the first peak HAp and a second peak HBp at which the heat release rate is the highest. Corresponding to the first and second peaks HAp and HBp, two peaks occur also in a rate of change (increasing rate) of the combustion pressure.

When comparing a peak height XA which is a value (peak value) of the heat release rate in the first peak HAp with a peak height XB which is a value (peak value) of the heat release rate in the second peak HBp, the height XA of the first peak HAp is smaller than the height XB of the second peak HBp in the heat-release characteristic illustrated in FIG. 9A. However, if one of the heights XA of the first peak HAp and the height XB of the second peak HBp is significantly higher than the other, combustion noise increases accordingly. Therefore, it is desirable to control the heat-release rates of the early-stage combustion portion HA and the late-stage combustion portion HB so that a difference between the height XA of the first peak HAp and the height XB of the second peak HBp does not become excessive.

Moreover, suppose that an interval between an occurring timing YA of the first peak HAp and an occurring timing YB of the second peak HBp is a peak interval Z. This peak interval Z has large influence on combustion noise. That is, if the peak interval Z is made an interval to cause the pressure wave (sound wave) resulting from the combustion of the early-stage combustion portion HA and the pressure wave resulting from the combustion of the late-stage combustion portion HB to cancel each other out, the pressure wave (combustion noise) which appears according to the frequency effect can be reduced. Description is added based on FIG. 9B.

Figure 9B:
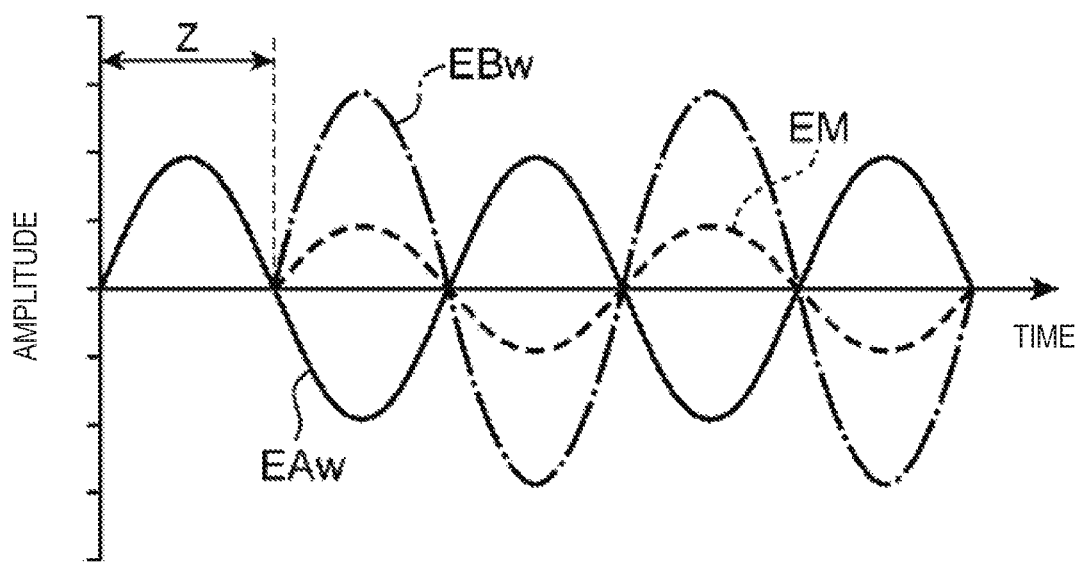
FIG. 9B is a graph schematically illustrating a cancellation effect of pressure waves.

FIG. 9B is a schematic diagram illustrating the cancellation effect of the pressure waves. In FIG. 9B, each pressure wave when the peak interval Z illustrated in FIG. 9A is set as the interval so that the pressure waves originated in the combustions of the early-stage combustion portion HA and the late-stage combustion portion HB cancel each other out is illustrated. In FIG. 9B, suppose that an early-stage pressure wave resulting from the combustion of the early-stage combustion portion HA is EAw, and a late-stage pressure wave resulting from the combustion of the late-stage combustion portion HB is EBw, both the early-stage pressure wave EAw and the late-stage pressure wave EBw are pressure waves originated in compression ignition combustion, and their cycles are fundamentally the same value Fw. In this case, if the peak interval Z illustrated in FIG. 9A is set as half of the cycle Fw of the early-stage pressure wave EAw and the late-stage pressure wave EBw, the early-stage pressure wave EAw and the late-stage pressure wave EBw become opposite phases to each other and interfere so that they cancel each other out, thereby significantly reducing the amplitude of a synthetic wave EM, as illustrated in FIG. 9B. This is the cancellation effect of the pressure waves (combustion noise).

Note that the amplitude of the early-stage pressure wave EAw and the amplitude of the late-stage pressure wave EBw become values according to the respective heights XA and XB of the first peak HAp and the second peak HBp, and do not necessarily become the same. That is, the injection amount and/or the injection timing of the pre-injection P1, and the injection amount and/or the injection timing of the main injection P3 are determined taking various demands of fuel efficiency, output torque, etc. of the engine into consideration, and, in many cases, they are set so that the height XB of the second peak HBp becomes slightly higher than the height XA of the first peak HAp (thereby, the amplitude of the late-stage pressure wave EBw becomes larger than the amplitude of the early-stage pressure wave EAw). Thus, even if the measure is taken in which the peak interval Z is set as half of the cycle Fw (or the value near the half value) so that the pressure waves EAw and EBw become the mutually opposite phases, the amplitude of the synthetic wave EM which is a pressure waveform after the synchronization does not become zero, as illustrated in FIG. 9B. However, comparing with the case where the peak interval Z is set as the value which is deviated from half of the cycle Fw, the effect to reduce the amplitude of the synthetic wave EM (as a result, combustion noise) is sufficient.

For example, like the comparative example illustrated by the waveform of the one-point chain line in FIG. 9A, supposed that the occurring timing of the first peak HAp is deviated from an expected value, and, as a result, the peak interval Z becomes the value which is deviated from half of the cycle Fw. In this case, since the early-stage pressure wave EAw and the late-stage pressure wave EBw do not become the completely opposite phases, the cancellation effect of both the pressure waves EAw and EBw is reduced, and in some cases, the synthetic wave EM will be rather amplified. For example, when both the pressure waves EAw and EBw become at the same phase, the synthetic wave EM becomes large amplitude by summing both the pressure waves EAw and EBw. That is, combustion noise increases.

From the above situation, in this embodiment, in order to reduce combustion noise as much as possible, the setting module 74 sets the injection amount and the injection timing of fuel from the injector 15 so that the interval of the first peak HAp and the second peak HBp (peak interval Z) becomes the interval ($\approx \frac{1}{2} \times Fw$) at which the early-stage pressure wave EAw and the later-stage pressure wave EBw cancel each other out. That is, the setting module 74 sets the target heat-release characteristic Hs which can demonstrate the cancellation effect of the pressure waves (combustion noise) and adjusts the injection amount and the injection timing in the pre-injection P1 or the main injection P3 (especially, the pre-injection P1) so as to perform the combustion which achieves the target heat-release characteristic Hs.

[Estimating Model Equation]

Figure 10:
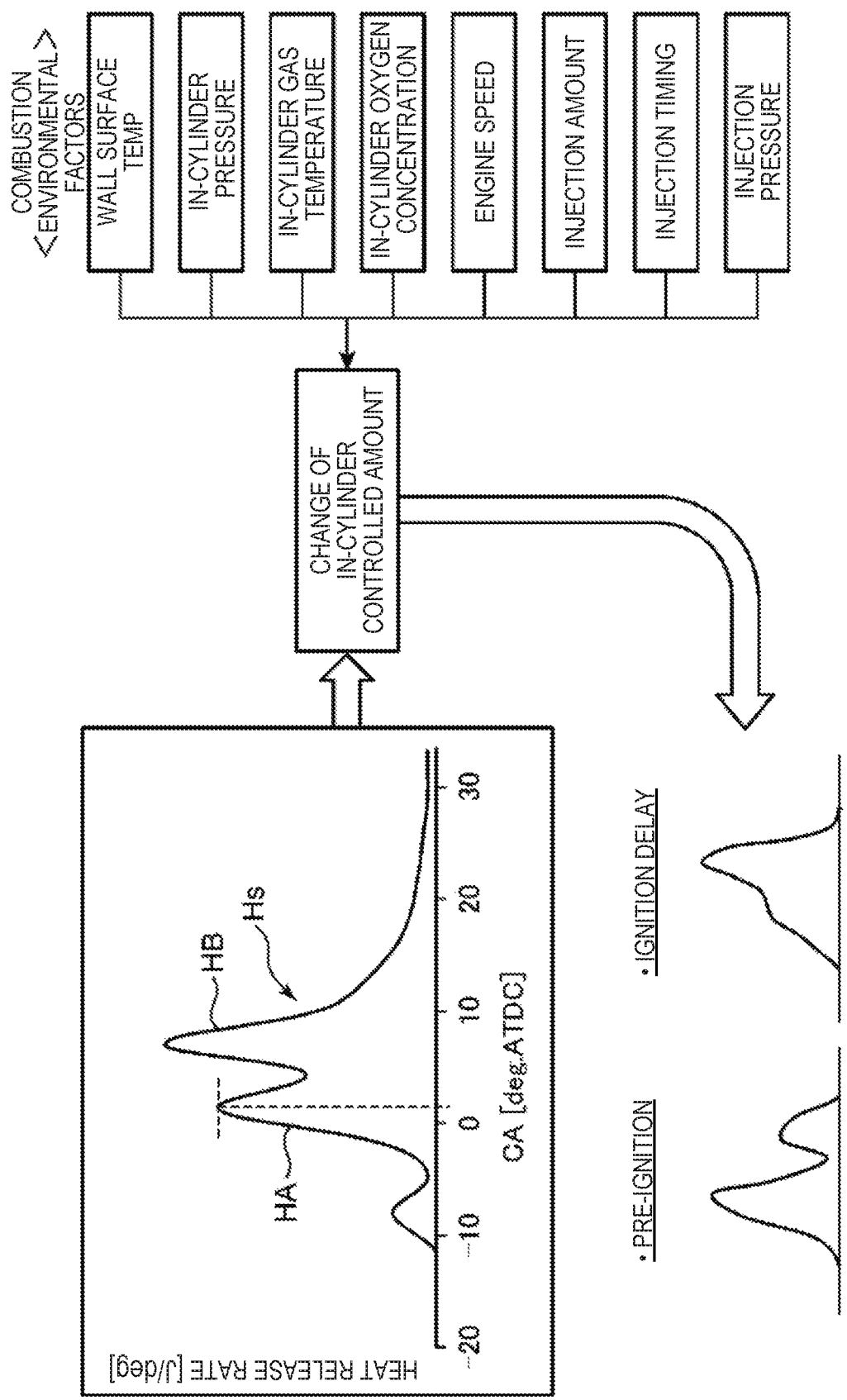
FIG. 10 is a conceptual view illustrating the combustion environmental factors which affect an achievement of the target heat-release characteristic.

Next, a specific example of the estimating model equation used by the estimating module 75 during the operation in the PCI range is described. FIG. 10 is a view illustrating the combustion environmental factors which affect the achievement of the target heat-release characteristic. Suppose that the target heat-release characteristic Hs as illustrated in the upper left of FIG. 10 is stored in the memory 77. If each combustion environmental factor is within an anticipated standard range, the combustion corresponding to the target heat-release characteristic Hs can be achieved inside the combustion chamber 6 by setting the injection amount and the injection timing of each fuel injection including the pre-injection P1 and the main injection P3 as a given reference amount and a given reference timing. Here, the reference amount and the reference timing of the fuel injection are stored beforehand in the memory 77 as an injection amount and an injection timing at which the target heat-release characteristic Hs can be acquired when the combustion environmental factors are within the standard range. The reference amount and the reference timing are, mainly, variably set according to the engine load and the engine speed which are identified from the accelerator opening, etc. For example, the reference amount increases as the accelerator opening (engine load) increases, and the reference timing is advanced or retarded according to a change in the reference amount.

However, when the combustion environmental factors are deviated from the standard range, the in-cylinder controlled amounts of the combustion chamber 6 vary. Even if the reference amount and the reference timing are adopted under such a situation, the target heat-release characteristic Hs may not be acquired. For example, a pre-ignition and an ignition delay may occur as illustrated in the lower left of FIG. 10. The pre-ignition is an ignition of the mixture gas becoming earlier than an expected timing to cause the early-stage combustion portion HA to have an excessively high heat release rate. The ignition delay is a delay of ignition of the mixture gas with respect to the expected timing to cause the late-stage combustion portion HB to have an excessively high heat release rate.

The main combustion environmental factors which affect the in-cylinder controlled amounts are the wall surface temperature of the combustion chamber 6, the in-cylinder pressure, the in-cylinder gas temperature, the in-cylinder oxygen concentration, the engine speed, the fuel injection amount, the fuel injection timing, and the injection pressure, as listed in the right column of FIG. 10. For example, the wall surface temperature, the in-cylinder pressure, and the in-cylinder gas temperature vary according to the ambient temperature, the open air pressure, and the engine cooling water temperature. Moreover, the in-cylinder oxygen concentration varies according to the oxygen concentration in air which flows into the intake passage 30 from the exterior (open air), the EGR gas amount taken into the combustion chamber 6, etc. Further, the combustion environmental factors may be varied also according to the transitional factor(s) when the operating state changes significantly. Note that "the wall surface temperature of the combustion chamber 6" as used herein refers to a temperature of an inner circumferential wall of the cylinder block 3 which defines the cylinder 2, and "the in-cylinder pressure" refers to a pressure of internal gas of the combustion chamber 6, "the in-cylinder gas temperature" is a temperature of the internal gas of the combustion chamber 6, and "the in-cylinder oxygen concentration" is an oxygen concentration in the internal gas of the combustion chamber 6. Moreover, "the internal gas of the combustion chamber 6" is the entire gas which exists inside the combustion chamber 6 before the start of combustion (and after the end of an intake stroke), and when EGR is performed, it is mixed gas of air and EGR gas which are introduced into the combustion chamber 6.

FIG. 11A is a graph illustrating a model equation for estimating the occurring timing YA of the first peak HAp of the early-stage combustion portion HA in the heat-release characteristic H. As illustrated in FIG. 11A, the occurring timing YA of the first peak HAp is estimated as a "peak delay" which is a period from the start timing of the pre-injection P1 to the first peak HAp being occurred.

The estimating model equation for the peak delay is illustrated in FIG. 11B. Here, the influence of a change in various parameters on the peak delay is expressed by an Arrhenius equation. The right-hand side of this estimating equation is a polynomial which uses parameters of the combustion environmental factors listed in the right column of FIG. 10. That is, the peak delay is expressed by a polynomial which is obtained by multiplying a plurality of items corresponding to the parameters, such as the fuel injection amount, the fuel injection timing, the injection pressure, the in-cylinder pressure, the in-cylinder gas temperature, the wall surface temperature, the in-cylinder oxygen concentration, and the engine speed by a given coefficient A. The coefficient A is an intercept which entirely changes the value of the right-hand side. Indexes B-I given to the respective parameters, such as the injection amount and the injection timing of fuel, are to indicate the sensitivities of the parameters, where the positive sign indicates proportion and the negative sign indicates an inverse proportion. Note that an engine oil temperature, etc. may be added as an item.

FIG. 11C is a table illustrating a calibration result of the estimating model equation, where the value of the coefficient A, and the values of the indexes B-I are indicated. This result is obtained by acquiring data of the combustion waveform produced when variously changing the parameters, such as the fuel injection amount and the fuel injection timing, from their initial values by using a combustion simulation, etc., and based on the large number of acquired data, identifying a relationship between each parameter and the peak delay by a multiple linear regression analysis. Note that it is confirmed that an estimation-measurement difference which is a difference between the estimation result of the peak delay by the estimating model equation (a crank angle at which the first peak HAp occurs) and the peak delay by actual measurements is ±2 degrees or less.

Figure 12:
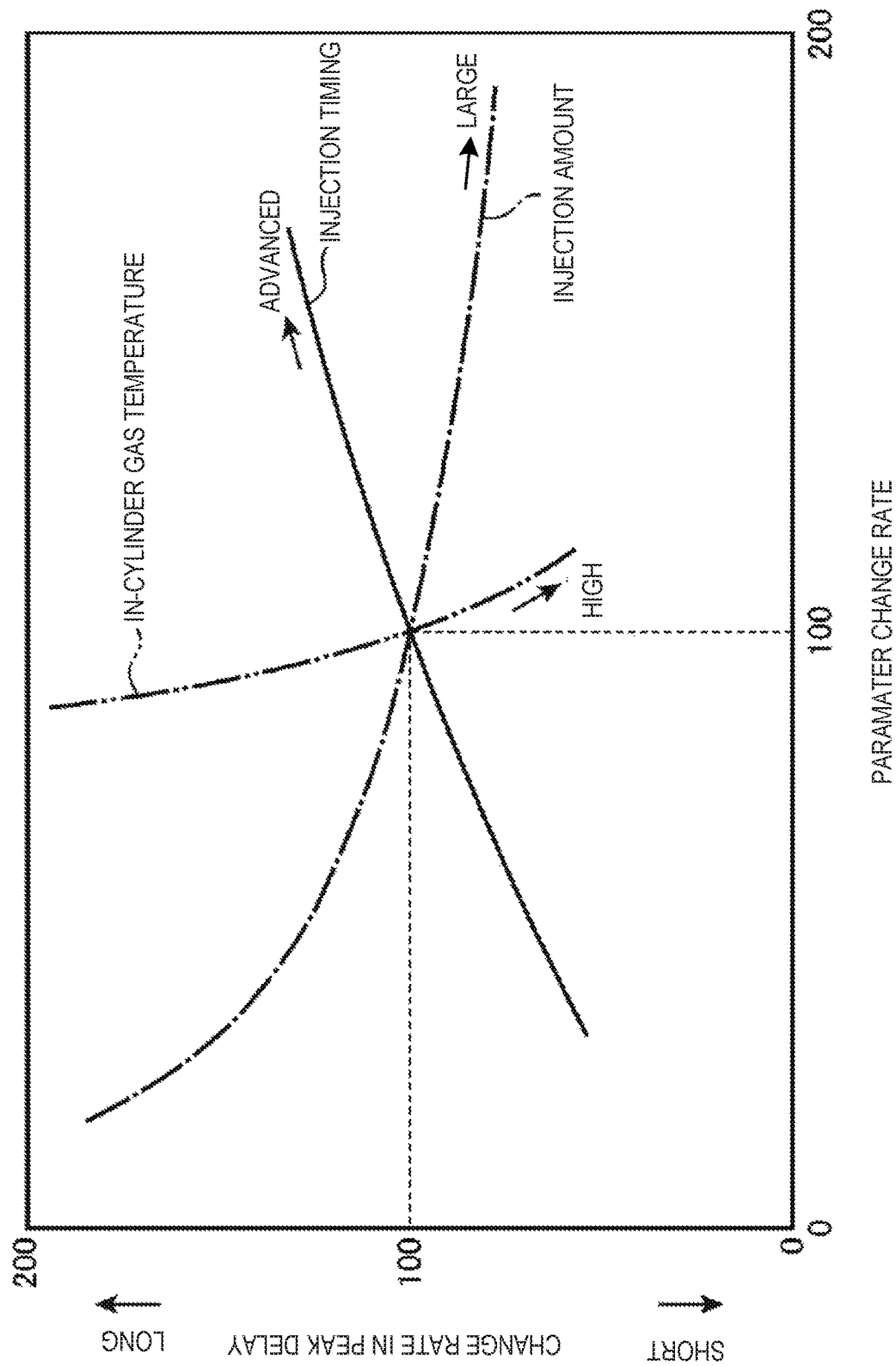
FIG. 12 is a graph illustrating an influence of changes in various parameters included in the estimating model equation of FIG. 11 on the peak delay.

FIG. 12 is a graph illustrating an influence of changes in the injection amount, the injection timing, and the in-cylinder gas temperature among the parameters included in the estimating model equation of FIG. 11B on the peak delay. In the graph of FIG. 12, a rate of change in the parameter in the horizontal axis is a value representing a rate of change with respect to the initial value when the initial value of each parameter is set to 100, and a rate of change in the peak delay in the vertical axis is a value representing a rate of change with respect to the initial value (i.e., a peak delay acquired when all the parameter are the initial values) when the initial value of the peak delay is set to 100. In other words, in the graph of FIG. 12, the change in each parameter and the change in the peak delay accompanying the change in each parameter are expressed by a dimensionless amount on the basis of the initial value (100). In this case, the injection amount increases (decreases) from the initial value as the value of the horizontal axis becomes larger (smaller) than 100, the injection timing is advanced (retarded) from the initial value as the value of the horizontal axis becomes larger (smaller) than 100, and the in-cylinder gas temperature increases (decreases) from the initial value as the value of the horizontal axis becomes larger (smaller) than 100. Moreover, as for the peak delay, it becomes longer (shorter) as the value of the vertical axis becomes larger (smaller) than 100.

As understood from the graph of FIG. 12, each of the parameters, such as the injection amount, the injection timing, and the in-cylinder gas temperature, influences the peak delay as follows under a condition of other parameters being constant.

Peak delay becomes shorter (longer) as the injection amount increases (decreases).

Peak delay becomes longer (shorter) as the injection timing is advanced (retarded).

Peak delay becomes shorter (longer) as the in-cylinder gas temperature increases (decreases).

Next, the estimating model equation of the height XA of the first peak HAp is described with reference to FIGS. 13A and 13B. As illustrated in FIG. 13A, the height XA of the first peak HAp (hereinafter, simply referred to as the "peak height") can be obtained using the Arrhenius equation which is a combination of the estimating model equation of the "peak delay" illustrated in FIG. 11B and a known combustion efficiency estimating model equation. The right-hand side of the estimating equation is a polynomial which is obtained by multiplying a plurality of items corresponding to the respective parameters of the peak delay, the combustion efficiency, the engine speed, and the injection amount, which are described above, by the given coefficient A. FIG. 13B is a table illustrating a calibration result of the estimating model equation of FIG. 13A, where the value of the coefficient A and the values of the indexes B-E obtained by the multiple linear regression analysis are indicated.

Figure 14A:
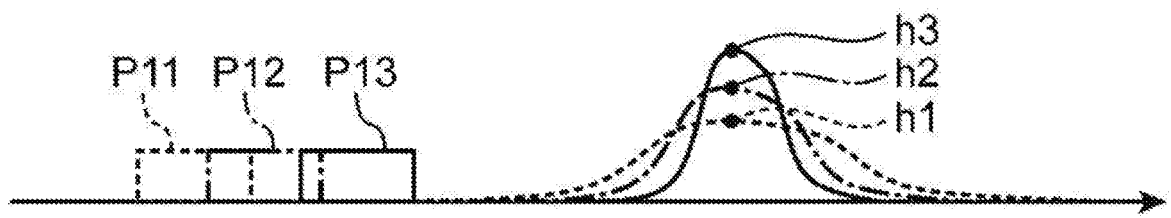
FIG. 14A is a graph schematically illustrating an influence of the change in the peak delay on the peak height.

FIG. 14A is a graph illustrating an influence of the peak delay on the peak height. When parameters other than the peak delay are constant, the peak height becomes higher as the peak delay becomes shorter. For example, suppose that there are a plurality of fuel injections P11, P12, and P13 performed at different timings, and a plurality of heat release having peaks at a certain timing. Further, suppose that the fuel injection timing shall become late in order of P11→P12→P13 (however, the injection amount is constant), and accordingly, the peak delay (a period from the start of the injection to the occurrence of the peak) becomes shorter in order of P11→P12→P13. In this case, if the peak height of the heat release rate produced corresponding to the fuel injection P11 is h1, the peak height of the heat release rate produced corresponding to the fuel injection P12 is h2, and the peak height of the heat release rate produced corresponding to the fuel injection P13 is h3, the peak height becomes higher in order of h1→h2→h3. Thus, the peak height becomes higher as the peak delay becomes shorter.

Figure 14B:
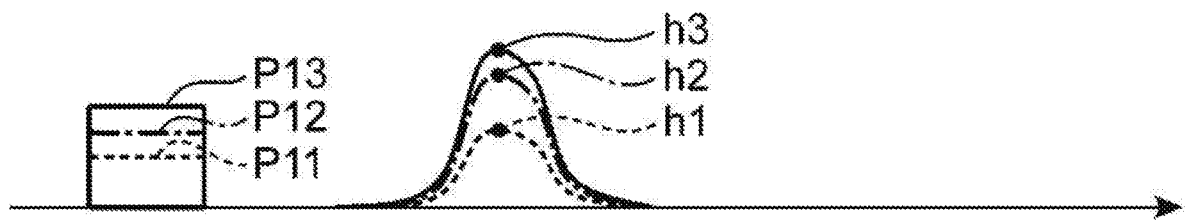
FIG. 14B is a graph schematically illustrating an influence of a change in an injection amount on the peak height.

FIG. 14B is a graph illustrating an influence of the fuel injection amount on the peak height. When parameters other than the peak height are constant, the peak height becomes higher as the injection amount increases. For example, suppose that there are a plurality of fuel injections P11, P12, and P13 which bring different injection amounts, and a plurality of heat releases having peaks at a certain timing. Suppose that the fuel injection amount increases in order of P11→P12→P13 (however, the injection timing is constant). In this case, if the peak height of the heat release rate produced corresponding to the fuel injection P11 is h1, the peak height of the heat release rate produced corresponding to the fuel injection P12 is h2, and the peak height of the heat release rate produced corresponding to the fuel injection P13 is h3, the peak height becomes higher in order of h1→h2→h3. Thus, the peak height becomes higher as the fuel injection amount increases.

The estimating model equations of the peak delay and peak height (FIGS. 11B and 13A) described above are stored beforehand in the memory 77. The estimating module 75 reads the estimating model equations from the memory 77, and performs the estimations of the occurring timing YA and the height XA of the first peak HAp produced under the present environmental condition for every combustion cycle.

[Control Flow]

Figure 15:
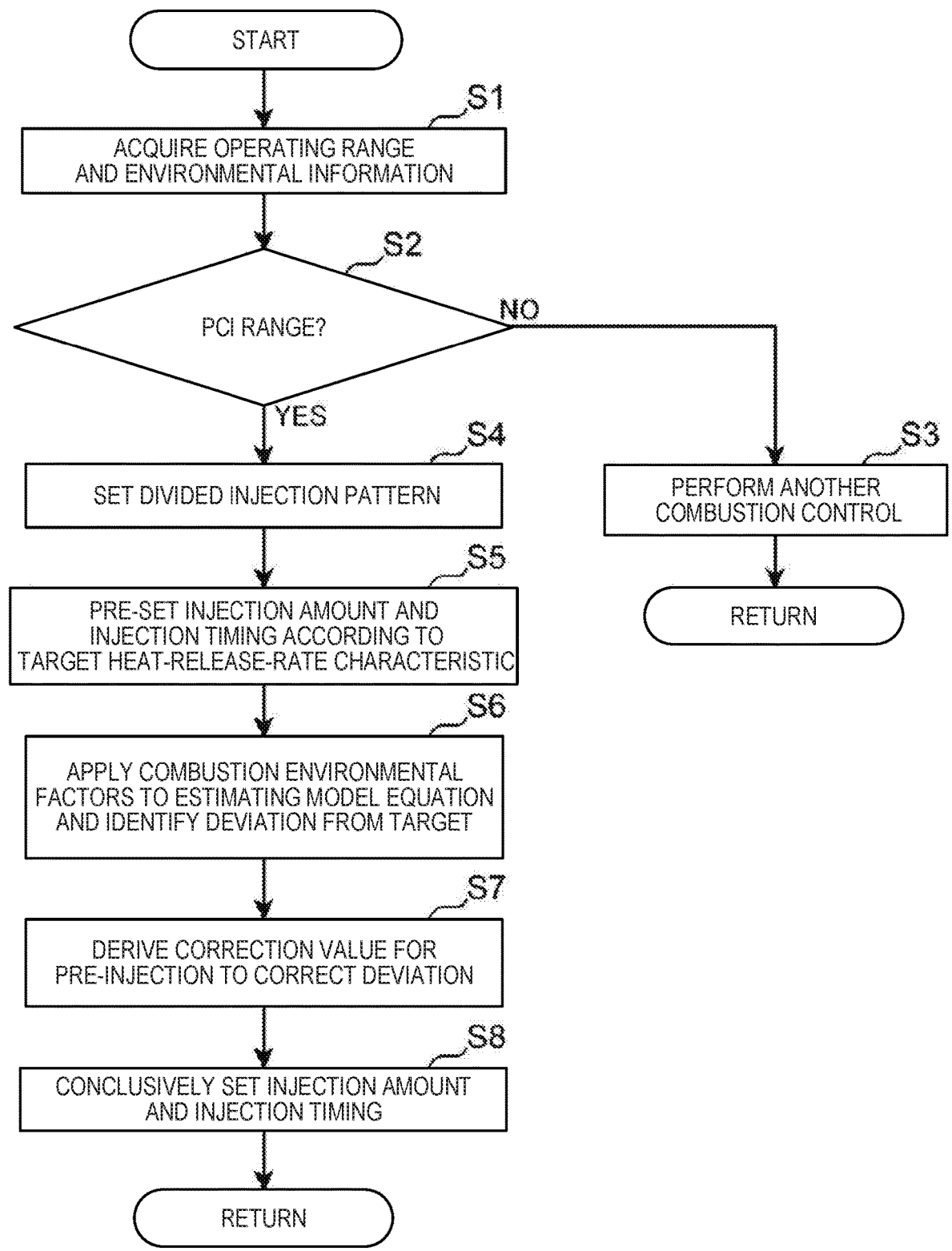
FIG. 15 is a flowchart illustrating one example of a fuel injection control.

FIG. 15 is a flowchart illustrating one example of the fuel injection control by the controller 70. When the control illustrated in this flowchart starts, the operating state determining module 71 of the controller 70 acquires the information on the engine operating range, and the environmental information corresponding to the combustion environmental factors described above, based on the detection value of the sensors SN1-SN12 illustrated in FIG. 7 (Step S1).

Then, the operating state determining module 71 determines based on the information on the operating range acquired at Step S1 whether the present operating range falls within the PCI range where the premixed compression ignition combustion is performed (Step S2). If it does not fall within the PCI range (NO at Step S2), the fuel injection controlling module 72 of the controller 70 performs the fuel injection corresponding to another combustion control defined beforehand for the operating range other than the PCI range (Step S3). That is, the injection pattern selecting module 73 of the fuel injection controlling module 72 sets the fuel-injection patterns corresponding to other combustion controls.

On the other hand, if the operating range falls within the PCI range (YES at Step S2), the injection pattern selecting module 73 sets a divided injection pattern including the pre-injection P1 and the main injection P3 as illustrated in FIG. 5 (Step S4).

Then, the setting module 74 of the fuel injection controlling module 72 temporarily sets the injection amounts and the injection timings of the respective fuel injections including the pre-injection P1 and the main injection P3 (Step S5). The injection amounts and the injection timings temporarily set here are the reference amounts and the reference timings stored beforehand in the memory 77 in order to acquire the target heat-release characteristic Hs illustrated, for example, in FIG. 8. As described already, the injection amounts and the injection timings which can acquire the target heat-release characteristic Hs when the combustion environmental factors are within the standard range are stored beforehand in the memory 77 as the reference amounts and the reference timings. The setting module 74 reads the reference amounts and the reference timings to suit the present accelerator opening (engine load), the present engine speed, etc. from the memory 77, and sets these as the temporary target values of the injection amounts and the injection timings.

Then, the estimating module 75 of the fuel injection controlling module 72 derives an estimated characteristic of the heat release rate based on the environmental information (combustion environmental factors) acquired at Step S1, by using the estimating model equation (FIGS. 11B and 13A) stored in the memory 77. Below, the heat-release characteristic estimated using the estimating model equation in this way is referred to as an estimated heat-release characteristic Hp. Further, the estimating module 75 compares this estimated heat-release characteristic Hp with the target heat-release characteristic Hs to identify a difference therebetween, i.e., a deviation of the estimation from the target in the heat release rate (Step S6).

Then, the correcting module 76 of the fuel injection controlling module 72 derives a correction value for correcting the injection amount or the injection timing of the pre-injection P1 which is temporarily set at Step S5 in order to correct the deviation identified at Step S6 (Step S7). For example, based on the comparison of the estimated heat-release characteristic Hp with the target heat-release characteristic Hs, the height XA of the first peak HAp which is a peak of the heat release rate of the early-stage combustion portion HA is estimated to be larger or smaller than the target value, or the occurring timing YA of the first peak HAp is estimated to be later or earlier than the target value. In this case, the correcting module 76 derives a correction value in order to correct the deviation for at least one of the injection amount and the injection timing of the pre-injection P1, based on the deviation of the peak height XA or the occurring timing YA. Of course, if the combustion environmental factor is within the predefined range where the correction is not needed, the correction by the correcting module 76 will not be performed.

Then, the setting module 74 conclusively sets the injection amounts and the injection timings of the respective fuel injections including the pre-injection P1 and the main injection P3 with reference to the correction values acquired at Step S7 (Step S8). Then, the fuel injection controlling module 72 controls the injection of the injector 15 so that the injection amounts and the injection timings are realized as this setting.

Specifically, at Step S8, the setting module 74 corrects the injection amount or the injection timing of the pre-injection P1 temporarily set at Step S5 (i.e., the reference amount or the reference timing), by using the correction value acquired at Step S7. Here, when the injection amount of the pre-injection P1 is to be corrected at Step S8, the setting module 74 adjusts the injection amount of the main injection P3 according to the corrected injection amount of the pre-injection P1. Moreover, when the middle injection P2 is to be performed between the injections P1 and P3, the setting module 74 also adjusts the injection amount of the middle injection P2 as needed. That is, when the injection amount of the pre-injection P1 is to be corrected, the setting module 74 increases or reduces incidentally the injection amount of the fuel injection other than the pre-injection P1 to maintain the fuel injection amount during one cycle (total amount of the fuel injection including the pre-injection P1 and the main injection P3).

At Step S8, the final injection amounts and the final injection timings of the pre-injection P1 and the main injection P3 (in some cases, also for the middle injection P2) are determined by the above processing. Note that as described already, in the PCI range where the plurality of injections including the pre-injection P1 and the main injection P3 are performed, if the mode of the pre-injection P1 is determined, the combustion accompanying the subsequent fuel injection becomes one with high robustness. Therefore, in this embodiment as described above, the injection amount and/or the injection timing of the pre-injection P1 are primarily determined, and then the injection amount of the main injection P3, etc. is determined.

[Specific Example of Correction]

Next, one specific example of the fuel injection control including the correction control described above is described with reference to FIGS. 16 to 20. Here, the correction control of fuel injection when an increase or a decrease of the intake air temperature is detected in the PCI range is especially described.

Figure 16:
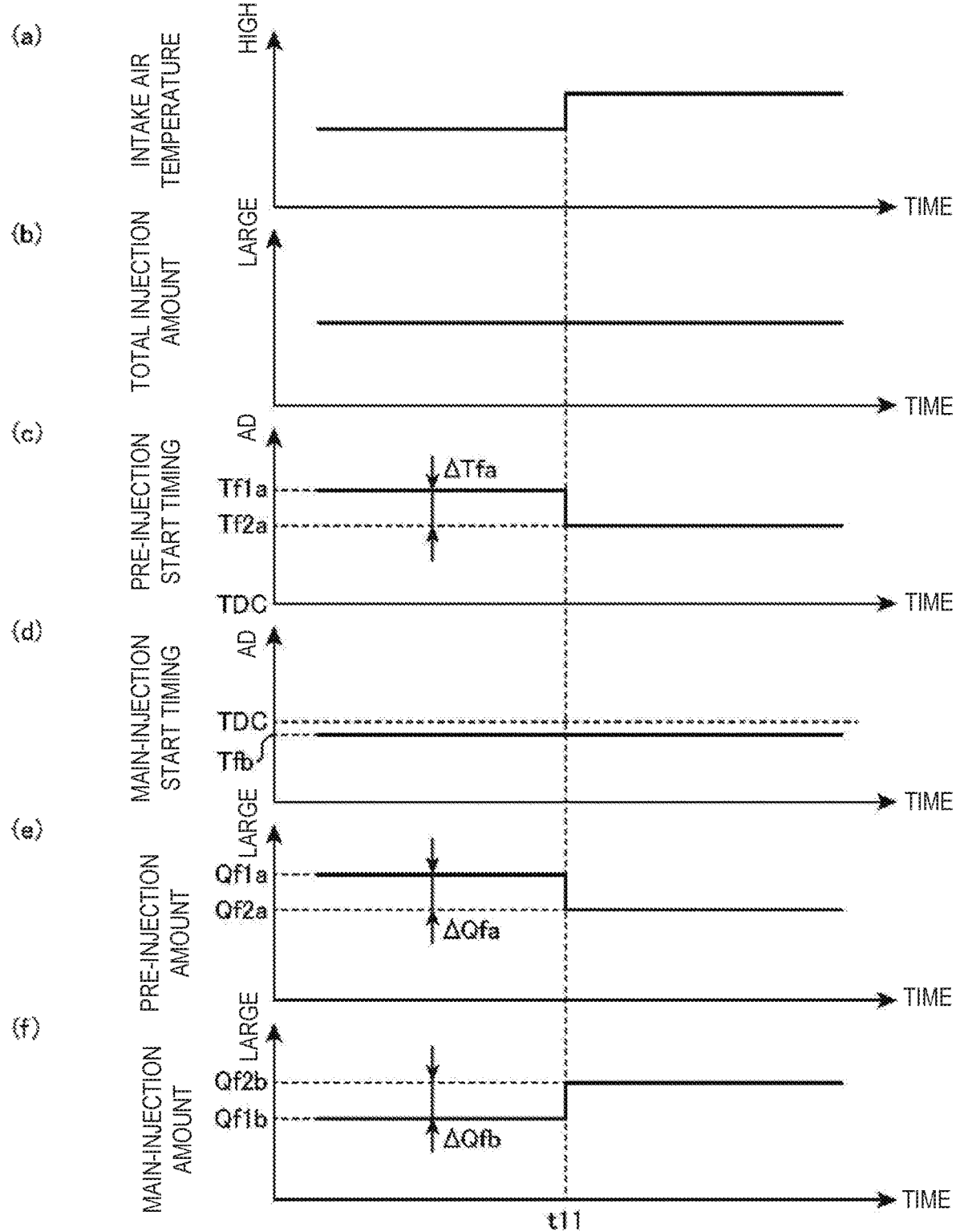
FIG. 16 is a time chart illustrating temporal changes in various controlled amounts before and after an intake air temperature increase.

FIG. 16 is a time chart illustrating temporal changes in various controlled amounts before and after the intake air temperature increase. A time point t11 in this time chart is a time point at which the increase in the intake air temperature is detected by the intake-air-temperature sensor SN4 (Chart (a)). For example, if a vehicle enters into a tunnel where the temperature is relatively high from the exterior of the tunnel where the temperature is relatively low, an increase of the intake air temperature may be detected like at the time point t11. Note that as a premise of the time chart in FIG. 16, the accelerator opening (engine load) and the engine speed are unchanged before and after the time point t11 at which the intake air temperature increases. Therefore, the total injection amount of fuel injected from the injector 15 during one cycle is also unchanged before and after the time point t11 (Chart (b)).

If the increase of the intake air temperature is detected at the time point t11 as described above, the in-cylinder gas temperature which is the temperature of the internal gas of the combustion chamber 6 also increases. In the case of FIG. 16, it is assumed that an increasing range of the in-cylinder gas temperature is comparatively large so that the in-cylinder gas temperature goes outside the standard range (the range expected as a precondition under which the target heat-release characteristic Hs can be acquired). Such a comparatively large increase of the in-cylinder gas temperature brings about an action of shortening the peak delay (FIG. 11A) which is a period from the injection start to the occurring timing YA of the first peak HAp to cause a change in the heat-release characteristic H (the deviation of the estimated heat-release characteristic Hp from the target heat-release characteristic Hs). Thus, in order to eliminate the change, as illustrated in the charts (c), (e), and (f) of FIG. 16, the fuel injection controlling module 72 decreases the injection amount of the pre-injection P1, retards the injection timing of the pre-injection P1, and increases the injection amount of the main injection P3 after the time point t11.

Specifically, here, an injection timing (injection start timing) of the pre-injection P1 set before the time point t11 is a pre-change pre-injection timing Tf1a, and an injection timing (injection start timing) of the pre-injection P1 set after the time point t11 is a post-change pre-injection timing Tf2a. Moreover, an injection amount of the pre-injection P1 set before the time point t11 is a pre-change pre-injection amount Qf1a, an injection amount of the pre-injection P1 set after the time point t11 is a post-change pre-injection amount Qf2a. Further, an injection amount of the main injection P3 set before the time point t11 is a pre-change main injection amount Qf1b, and an injection amount of the main injection P3 set after the time point t11 is a post-change main injection amount Qf2b. In this case, the post-change pre-injection timing Tf2a is set at the retarding side by ΔTfa than the pre-change pre-injection timing Tf1a (Chart (c)), the post-change pre-injection amount Qf2a is set less than the pre-change pre-injection amount Qf1a by ΔQfa (Chart (e)), and the post-change main injection amount Qf2b is set more than the pre-change main injection amount Qf1b by ΔQfb (Chart (f)).

In other words, the fuel injection controlling module 72 reduces the advancing amount of the injection timing of the pre-injection P1 from the compression top dead center (TDC) after the temperature increase (after the time point t11) from the advancing amount before the temperature increase (before time point t11), reduces the injection amount of the pre-injection P1 after the temperature increase from the injection amount before the temperature increase, and increases the injection amount of the main injection P3 after the temperature increase from the injection amount before the temperature increase.

On the other hand, the injection timing (injection start timing) of the main injection P3 will not be changed in particular. That is, the injection timing of the main injection P3 is maintained at a fixed timing Tfb before and after the time point t11 at which the intake air temperature increases (Chart (d)).

Here, since the intake-air-temperature sensor SN4 is to detect the temperature of intake air which circulates the intake passage 30 between the intercooler 33 and the surge tank 34, even if this intake-air-temperature sensor SN4 detects the increase of the intake air temperature, the in-cylinder gas temperature (temperature of the internal gas of the combustion chamber 6) has not yet increased. In other words, a time lag exists (though it is small) between the detection of the increase of the intake air temperature by the intake-air-temperature sensor SN4 and the actual increase of the in-cylinder gas temperature. Whereas, the change in the injection mode of fuel according to the increase of the intake air temperature is desired to be performed at the timing at which the in-cylinder gas temperature actually increases. Thus, strictly, the timing at which the control for changing the injection mode is started like the charts (c), (e), and (f) described above is set at a timing delayed by the time lag described above from the detection timing of the increase of the intake air temperature by the intake-air-temperature sensor SN4. However, since this time lag is small, the timing of the intake air temperature increase and the timing of the fuel injection mode change are both treated as the time point t11 in the time chart of FIG. 16.

Figure 17:
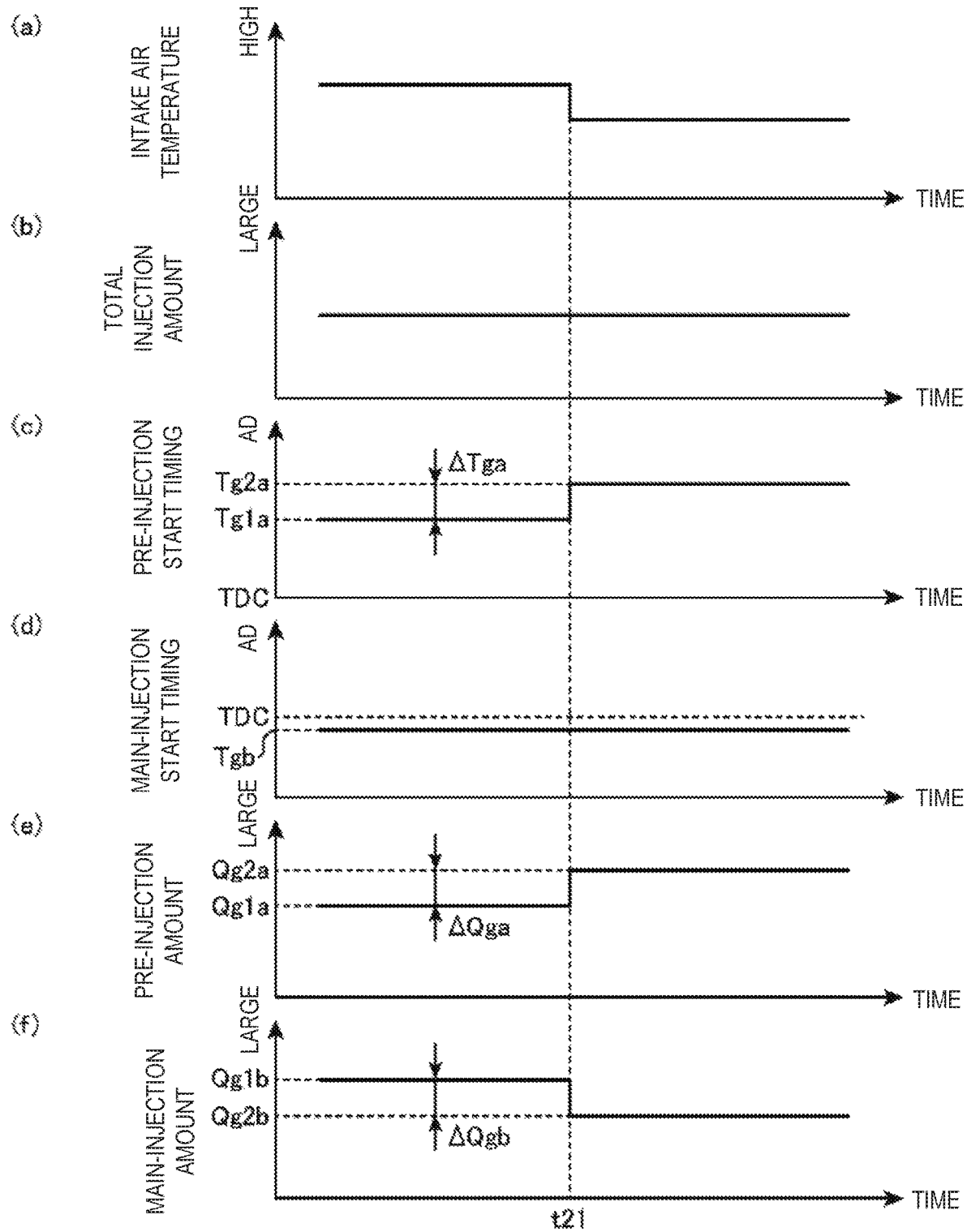
FIG. 17 is a time chart illustrating temporal changes in the various controlled amounts before and after the intake air temperature decrease.

As described above, although the control, when the intake air temperature increases is described by using FIG. 16, when the intake air temperature decreases, a correction control opposite from FIG. 16 will be performed. FIG. 17 is a time chart illustrating temporal changes in the various controlled amounts before and after the intake air temperature decreases. A time point t21 in the time chart of FIG. 17 is a time point at which a decrease of the intake air temperature is detected by the intake-air-temperature sensor SN4 (Chart (a)). For example, when the vehicle passes through a tunnel inside which the temperature is relatively high to the outside where the temperature is relatively low, the decrease of the intake air temperature may be detected like at the time point t21.

The decrease of the intake air temperature brings about an action of extending the peak delay (FIG. 11), and becomes a factor to cause the change in the heat-release characteristic H (the deviation of the estimated heat-release characteristic Hp from the target heat-release characteristic Hs). Thus, in order to eliminate the change, as illustrated in the charts (c), (e), and (f) of FIG. 17, the fuel injection controlling module 72 increases the injection amount of the pre-injection P1 and advances the injection timing of the pre-injection P1 after the time point t21, and decreases the injection amount of the main injection P3.

Specifically, here, an injection timing (injection start timing) of the pre-injection P1 set before the time point t21 is a pre-change pre-injection timing Tg1a, and an injection timing (injection start timing) of the pre-injection P1 set after the time point t21 is a post-change pre-injection timing Tg2a. Moreover, an injection amount of the pre-injection P1 set before the time point t21 is a pre-change pre-injection amount Qg1a, and an injection amount of the pre-injection P1 set after the time point t21 is a post-change pre-injection amount Qg2a. Further, an injection amount of the main injection P3 set before the time point t21 is a pre-change main injection amount Qg1b, and the injection amount of the main injection P3 set after the time point t21 is a post-change main injection amount Qg2b. In this case, the post-change pre-injection timing Tg2a is set at the advancing side of the pre-change pre-injection timing Tg1a by ΔTga (Chart (c)), and the post-change pre-injection amount Qg2a is set more than the pre-change pre-injection amount Qg1a by ΔQga (Chart (e)), and the post-change main injection amount Qg2b is set less than the pre-change main injection amount Qg1b by ΔQgb (Chart (f)).

In other words, the fuel injection controlling module 72 increases the advancing amount of the injection timing of the pre-injection P1 after the temperature decrease (after the time point t21) from the compression top dead center (TDC) than that before the temperature decrease (before the time point t21), increases the injection amount of the pre-injection P1 after the temperature decrease than that before the temperature increase, and decreases the injection amount of the main injection P3 after the temperature decrease than that before the temperature increase.

On the other hand, the injection timing (injection start timing) of the main injection P3 will not be changed in particular. That is, the injection timing of the main injection P3 is maintained at a fixed time Tgb before and after the time point t21 at which the intake air temperature decreases (Chart (d)).

Figure 18:
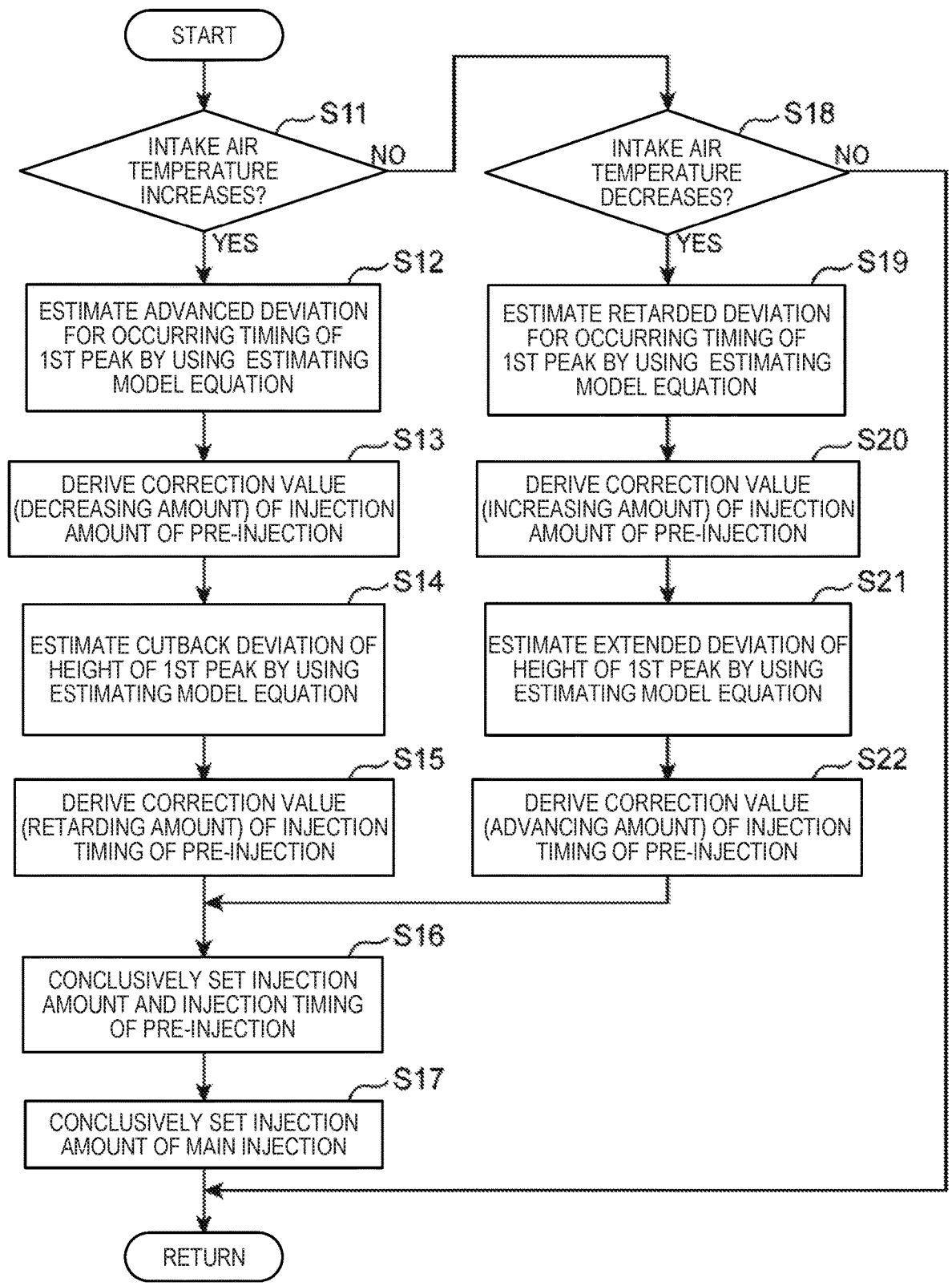
FIG. 18 is a flowchart illustrating one example of the fuel injection control performed when the intake air temperature increased or decreased.

FIG. 18 is a flowchart illustrating one specific example of the fuel injection control (control for changing the modes of the pre-injection P1 and the main injection P3) according to the increase or the decrease of the intake air temperature (as a result, the in-cylinder gas temperature) described above. Note that the flowchart of FIG. 18 constitutes a part of the processing at Steps S6-S8 in the flowchart of FIG. 15 described above, and is expressed as a control flow which is specialized in the control performed especially when the intake air temperature increases or decreases.

When the control illustrated in the flowchart of FIG. 18 is started, the operating state determining module 71 of the controller 70 determines whether the intake air temperature increased exceeding a given threshold based on the detection value of the intake-air-temperature sensor SN4 (Step S11). The threshold for the temperature increasing amount used herein is set as a value at which a significant deviation is caused in the heat-release characteristic when the intake air temperature increases exceeding the threshold (a comparatively large deviation which leads to an intolerable increase of combustion noise).

If it is determined as YES at Step S11 and it is confirmed that the intake air temperature increases exceeding the threshold, the estimating module 75 of the fuel injection controlling module 72 estimates an advanced deviation to be caused for the occurring timing YA of the first peak HAp which is the peak of the heat release rate of the early-stage combustion portion HA, by using the estimating model equation for the peak delay (FIG. 11B) stored in the memory 77 (Step S12). The term "advanced deviation" as used herein is a deviating amount of the occurring timing YA of the first peak HAp on the advancing side with respect to the target timing. That is, this increase of the intake air temperature leads to the increase of the in-cylinder gas temperature, and as illustrated in FIGS. 11 and 12, the increase of the in-cylinder gas temperature acts to shorten the peak delay which is the period from the start of the injection to the peak occurring timing. At this time, if the injection start timing is constant, the peak occurring timing will shift to the advancing side by shortening the peak delay. This means that the occurring timing YA of the first peak HAp shifts to the advancing side with respect to the target occurring timing (an occurring timing of the first peak in the target heat-release characteristic Hs). Thus, at Step S12, the advanced deviation which is the sifting amount of the occurring timing YA of the first peak HAp to the advancing side is estimated based on the increasing amount of the intake air temperature confirmed at Step S11.

Specifically, at Step S12, the estimating module 75 estimates an increasing amount of the in-cylinder gas temperature based on the increasing amount of the intake air temperature confirmed at Step S11, and applies the estimated increasing amount of the in-cylinder gas temperature to the estimating model equation for the peak delay (FIG. 11B) to find an estimated peak delay, and as a result, an estimated occurring timing of the first peak HAp. Then, the estimating module 75 compares the estimated occurring timing of the first peak HAp with the target occurring timing of the first peak HAp defined from the target heat-release characteristic Hs stored in the memory 77 to identify the advanced deviation which is the amount by which the occurring timing YA of the first peak HAp is shifted to the advancing side with respect to the target timing.

Note that although it is necessary to estimate the increasing amount of the in-cylinder gas temperature based on the increasing amount of the intake air temperature at Step S12, the control device which uses the intake-air-temperature sensor SN4 which detects the temperature of the intake air before the EGR gas is mixed like this embodiment can estimate the increasing amount of the in-cylinder gas temperature, for example, based on the given parameters including the EGR rate which is a mixing rate of the EGR gas with the intake air. In this case, the estimating module 75 estimates the increasing amount of the in-cylinder gas temperature using the given equation based on the increasing amount of the intake air temperature detected by the intake-air-temperature sensor SN4 (i.e., the increasing amount of the intake air temperature before EGR gas is mixed), the EGR rate identified based on the opening of the EGR valve 45, and the temperature of the EGR gas estimated based on the latest combustion state.

Then, the correcting module 76 of the fuel injection controlling module 72 derives a decreasing amount of the injection amount of the pre-injection P1 which is a correction value for excessively correcting the advanced deviation based on the advanced deviation of the occurring timing YA of the first peak HAp identified at Step S12 (Step S13). That is, the correcting module 76 sets the decreasing amount of the injection amount of the pre-injection P1 so that the occurring timing YA of the first peak HAp is retarded by a crank angle which exceeds the advanced deviation by a given amount. Note that the decreasing amount of the pre-injection P1 set here corresponds to ΔQfa illustrated in Chart (e) of FIG. 16, and is a decreasing amount with respect to the injection amount Qf1a set if there is no increase of the intake air temperature. The decreasing amount ΔQfa of the pre-injection P1 is set larger as the advanced deviation of the peak occurring timing YA increases.

Here, the decreasing amount ΔQfa of the pre-injection P1 is set somewhat excessively at Step S13 (i.e., the excessive decreasing amount ΔQfa is set such that the peak occurring timing YA is retarded by the crank angle exceeding the advanced deviation by the given amount) because the shortening of the peak delay by retarding of the pre-injection P1 which is performed together with the decreasing of the amount of the pre-injection P1 (refer to Chart (c) of FIG. 16 or Step S15 described later) is anticipated. That is, when the pre-injection P1 is retarded, the peak delay is shortened according to the retarding amount ΔTfa (FIG. 16), and, as a result, the peak occurring timing YA is advanced. Thus, when the correcting module 76 sets the decreasing amount ΔQfa of the pre-injection P1 at Step S13, it sets the decreasing amount ΔQfa of the pre-injection P1 somewhat excessively so that the final retarding amount of the peak occurring timing YA achieved by the combination with the retarding of the pre-injection P1, i.e., so that the final retarding amount obtained by subtracting the advancing amount of the peak occurring timing YA caused by retarding the pre-injection P1 (ΔTfa) from the retarding amount of the peak occurring timing YA caused by decreasing the amount of the pre-injection P1 (ΔQfa) becomes substantially in agreement with the advanced deviation. In other words, the correcting module 76 calculates a value obtained by adding an additional decreasing amount defined by foreseeing the reverse action caused by retarding the pre-injection P1 (ΔTfa) (advancing of the peak occurring timing YA) to a basic decreasing amount which is a decreasing amount of the pre-injection P1 required for reducing the advanced deviation to zero, as the decreasing amount ΔQfa of the pre-injection P1. Note that "the given amount" of "the crank angle exceeding the advanced deviation by the given amount" described above corresponds to the retarding amount of the peak occurring timing YA caused by the latter additional decreasing amount.

Next, the estimating module 75 uses the estimating model equation for the peak delay (FIG. 11B) and the estimating model equation for the peak height (FIG. 13A) which are stored in the memory 77 to estimate a cutback deviation of the height XA of the first peak HAp to be caused when decreasing the injection amount of the pre-injection P1 by the decreasing amount ΔQfa obtained at Step S13 (Step S14). The term "cutback deviation" as used herein refers to an amount by which the height XA of the first peak Hap is reduced with respect to the target height. That is, as illustrated in FIGS. 11 and 12, the reduction of the injection amount of fuel brings about an action to lengthen the peak delay, and according to FIGS. 13 and 14A, the extension of the peak delay brings about an action to lower the peak height. Thus, at Step S14, the cutback deviation, which is the amount by which the height XA of the first peak HAp is reduced, is estimated based on the decreasing amount ΔQfa of the pre-injection P1 obtained at Step S13.

Specifically, at Step S14, the estimating module 75 applies the decreasing amount ΔQfa of the pre-injection P1 obtained at Step S13 to the estimating model equation for the peak delay (FIG. 11B) to find an estimated change in the peak delay, and applies the obtained change in the peak delay to the estimating model equation for the peak height (FIG. 13A) to find the estimated height of the first peak HAp. Then, the estimating module 75 compares the estimated height of the first peak HAp with the target height of the first peak HAp defined based on the target heat-release characteristic Hs stored in the memory 77 to identify the cutback deviation which is the amount by which the height XA of the first peak HAp is reduced with respect to the target height.

Then, the correcting module 76 derives a retarding amount of the injection timing of the pre-injection P1 which is a correction value for correcting the cutback deviation substantially neither too much nor too little based on the cutback deviation of the height XA of the first peak HAp identified at Step S14 (Step S15). That is, the correcting module 76 sets the retarding amount of the injection timing of the pre-injection P1 so that the height XA of the first peak HAp increases by an amount corresponding to the cutback deviation (substantially the same quantity). Note that the retarding amount of the pre-injection P1 set here corresponds to ΔTfa illustrated in Chart (c) of FIG. 16, and is a retarding amount with respect to the injection timing Tf1$a$ set if there is no increase of the intake air temperature. The retarding amount ΔTfa of the pre-injection P1 is set larger as the cutback deviation of the peak height XA increases.

Then, the setting module 74 of the fuel injection controlling module 72 conclusively sets the injection amount and the injection timing of the pre-injection P1 with reference to the decreasing amount ΔQfa and the retarding amount ΔTfa which are derived as the correction values at Steps S13 and S15 (Step S16). That is, while the setting module 74 determines the injection amount which is obtained by subtracting the decreasing amount ΔQfa from the injection amount of the pre-injection P1 which is temporarily set at Step S5 of FIG. 15 (i.e., the reference amount), as the final injection amount of the pre-injection P1, it determines the fuel injection timing which is obtained by retarding the injection timing of the pre-injection P1 which is temporarily set at Step S5 (i.e., the reference timing) by the retarding amount ΔTfa, as the final injection timing of the pre-injection P1.

Then, the setting module 74 conclusively sets the injection amount of the main injection P3 based on the injection amount of the pre-injection P1 which is conclusively set at Step S16 (Step S17). That is, the setting module 74 increases the injection amount of the main injection P3 so that the total injection amount per one cycle including the injection amount of the pre-injection P1 which is conclusively set becomes the same as that before decreasing the amount of the pre-injection P1. For example, when the injection amount of the pre-injection P1 is reduced by ΔQfa as described above, the injection amount of the main injection P3 is increased so as to cancel ΔQfa. Note that when the injection amount of fuel injection other than the pre-injection P1 and the main injection P3 (e.g., the middle injection P2) is not changed, the increasing amount of the main injection P3 (ΔQfb of FIG. 16) becomes the same as the decreasing amount ΔQfa of the pre-injection P1.

At Step S17, only the injection amount of the main injection P3 is adjusted, and the injection timing will not be changed. That is, the injection timing (injection start timing) of the main injection P3 is maintained at the fixed timing Tfb (reference timing) regardless of whether the increase of the intake air temperature is detected (Chart (d) of FIG. 16).

Next, a control when determined as NO at Step S11, i.e., when the increase of the intake air temperature is not detected is described. In this case, the operating state determining module 71 determines whether the intake air temperature decreased exceeding a given threshold based on the detection value of the intake-air-temperature sensor SN4 (Step S18). The threshold for the temperature decreasing amount used herein is set as a value at which a significant deviation is caused in the heat-release characteristic when the intake air temperature decreases exceeding the threshold (a comparatively large deviation which leads to the intolerable increase of combustion noise).

If it is determined as YES at Step S18, and it is confirmed that the intake air temperature decreased exceeding the threshold, the estimating module 75 estimates a retarded deviation to be caused for the occurring timing YA of the first peak HAp, by using the estimating model equation for the peak delay (FIG. 11B) stored in the memory 77 (Step S19). The term "retarded deviation" as used herein refers to an amount by which the occurring timing YA of the first peak HAp is shifted to the retarding side with respect to the target timing. That is, the decrease of the intake air temperature leads to the decrease of the in-cylinder gas temperature, and this decrease of the in-cylinder gas temperature brings about an action to lengthen the peak delay which is a period from the start of the injection to the peak occurring timing, as illustrated in FIGS. 11 and 12. At this time, if the injection start timing is constant, the peak occurring timing shifts to the retarding side by the extension of the peak delay. This means that the occurring timing YA of the first peak HAp shifts to the retarding side with respect to the target occurring timing (occurring timing of the first peak in the target heat-release characteristic Hs). Thus, at Step S19, the retarded deviation which is the amount by which the occurring timing YA of the first peak HAp is shifted to the retarding side is estimated based on the decreasing amount of the intake air temperature confirmed at Step S18.

Specifically, at Step S19, the estimating module 75 estimates the decreasing amount of the in-cylinder gas temperature based on the decreasing amount of the intake air temperature confirmed at Step S18, and applies the estimated decreasing amount of the in-cylinder gas temperature to the estimating model equation for the peak delay (FIG. 11B) to find the estimated peak delay, as a result, the estimated occurring timing of the first peak HAp. Then, the estimating module 75 compares the estimated occurring timing of the first peak HAp with the target occurring timing of the first peak HAp defined from the target heat-release characteristic Hs stored in the memory 77 to identify the retarded deviation which is the amount by which the occurring timing YA of the first peak Hap is shifted to the retarding side with respect to the target timing. Note that as the method of estimating the decreasing amount of the in-cylinder gas temperature based on the decreasing amount of the intake air temperature, a similar method to the estimation of the increasing amount of the in-cylinder gas temperature at Step S12 described above may be used.

Then, the correcting module 76 derives the increasing amount of the injection amount of the pre-injection P1 which is a correction value for excessively correcting the retarded deviation based on the retarded deviation of the occurring timing YA of the first peak HAp identified at Step S19 (Step S20). That is, the correcting module 76 sets the increasing amount of the injection amount of the pre-injection P1 so that the occurring timing YA of the first peak HAp is advanced by a crank angle exceeding the retarded deviation by a given amount. Note that the increasing amount of the pre-injection P1 set here corresponds to $\Delta Qga$ illustrated in Chart (e) of FIG. 17, and is an increasing amount of the injection amount $Qg1a$ set if there is no decrease of the intake air temperature. The increasing amount $\Delta Qga$ of the pre-injection P1 is set larger as the retarded deviation of the peak occurring timing YA increases.

Here, the increasing amount $\Delta Qga$ of the pre-injection P1 is set somewhat excessively at Step S20 (i.e., the excessive increasing amount $\Delta Qga$ is set such that the peak occurring timing YA is advanced by the crank angle exceeding the retarded deviation by the given amount) because of the same reason as the case of Step S13 described above, i.e., the extension of the peak delay by advancing of the pre-injection P1 which is performed together with the increasing of the amount of the pre-injection P1 (refer to Chart (c) of FIG. 17 or Step S22 described later) is anticipated.

Next, the estimating module 75 uses the estimating model equation for the peak delay (FIG. 11B) and the estimating model equation for the peak height (FIG. 13A) which are stored in the memory 77 to estimate an extended deviation of the height XA of the first peak HAp to be caused when increasing the injection amount of the pre-injection P1 by the increasing amount $\Delta Qga$ obtained at Step S20 (Step S21). The term "extended deviation" as used herein refers to an increasing amount of the height XA of the first peak HAp with respect to the target height. That is, as illustrated in FIGS. 11 and 12, the increase of the fuel injection amount brings about an action to shorten the peak delay, and according to FIGS. 13 and 14A, the shortening of the peak delay brings about an action to increase the peak height. Thus, at Step S21, the extended deviation which is the increasing amount of the height XA of the first peak HAp is estimated based on the increasing amount $\Delta Qga$ of the pre-injection P1 obtained at Step S20.

Specifically, at Step S21, the estimating module 75 applies the increasing amount $\Delta Qga$ of the pre-injection P1 obtained at Step S20 to the estimating model equation for the peak delay (FIG. 11B) to find the estimated change in the peak delay, and applies the obtained change in the peak delay to the estimating model equation for the peak height (FIG. 13A) to find the estimated height of the first peak HAp. Then, the estimating module 75 compares the estimated height of the first peak HAp with the target height of the first peak HAp defined based on the target heat-release characteristic Hs stored in the memory 77 to identify the extended deviation which is the amount by which the height XA of the first peak HAp is increased with respect to the target height.

Then, the correcting module 76 derives an advancing amount of the injection timing of the pre-injection P1 which is a correction value for correcting the extended deviation substantially neither too much nor too little based on the extended deviation of the height XA of the first peak HAp identified at Step S21 (Step S22). That is, the correcting module 76 sets the advancing amount of the injection timing of the pre-injection P1 so that the height XA of the first peak HAp is lowered by an amount corresponding to the extended deviation (substantially the same quantity). Note that the advancing amount of the pre-injection P1 set here corresponds to $\Delta Tga$ illustrated in Chart (c) of FIG. 17, and is an advancing amount of the injection timing $Tg1a$ set when there is no decrease of the intake air temperature. The advancing amount $\Delta Tga$ of the pre-injection P1 is set larger as the extended deviation of the peak height XA increases.

Then, the setting module 74 conclusively sets the injection amount and the injection timing of the pre-injection P1 with reference to the increasing amount $\Delta Qga$ and the advancing amount $\Delta Tga$ which are derived as the correction values at Steps S20 and S22 (Step S16). That is, while the setting module 74 determines the injection amount which is obtained by adding the injection amount of the pre-injection P1 which is temporarily set at Step S5 of FIG. 15 (i.e., the reference amount) to the increasing amount $\Delta Qga$, as the final injection amount of the pre-injection P1, it determines the fuel injection timing which is obtained by advancing the injection timing of the pre-injection P1 which are temporarily set at Step S5 (i.e., the reference timing) by the advancing amount $\Delta Tga$, as the final injection timing of the pre-injection P1.

Then, the setting module 74 conclusively sets the injection amount of the main injection P3 based on the injection amount of the pre-injection P1 which is conclusively set at Step S16 (Step S17). That is, the setting module 74 reduces the injection amount of the main injection P3 so that the total injection amount per one cycle including the injection amount of the pre-injection P1 which is conclusively set becomes the same as that before increasing the amount of the pre-injection P1.

Figure 19:
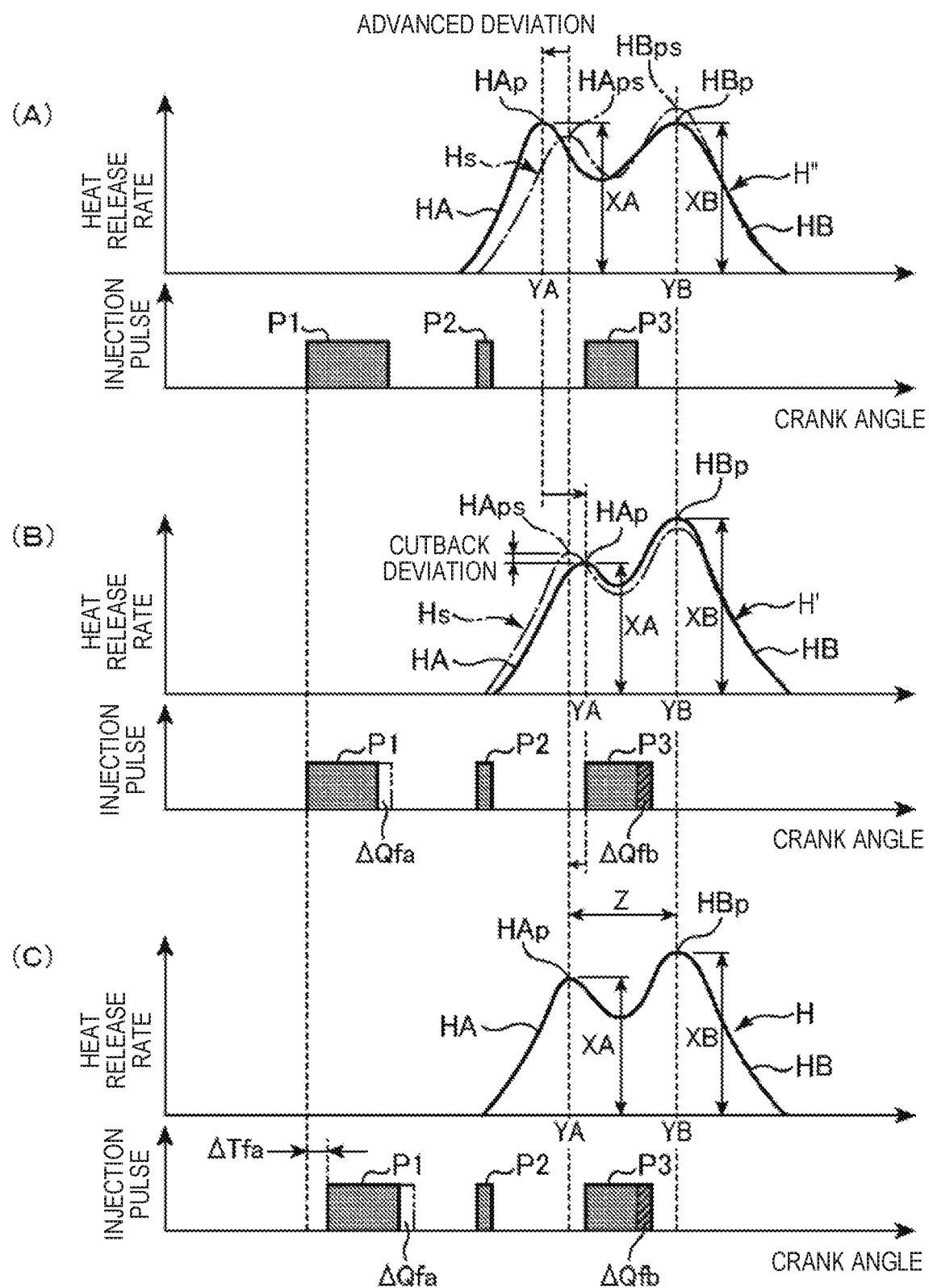
FIG. 19 is a graph illustrating a heat-release characteristic, where Chart (A) is a case where neither the injection amount nor the injection timing of the pre-injection is corrected when the intake air temperature increases, Chart (B) is a case where only the injection amount of the pre-injection is corrected, and Chart (C) is a case where both of the injection amount and the injection timing of the pre-injection are corrected.
Figure 20:
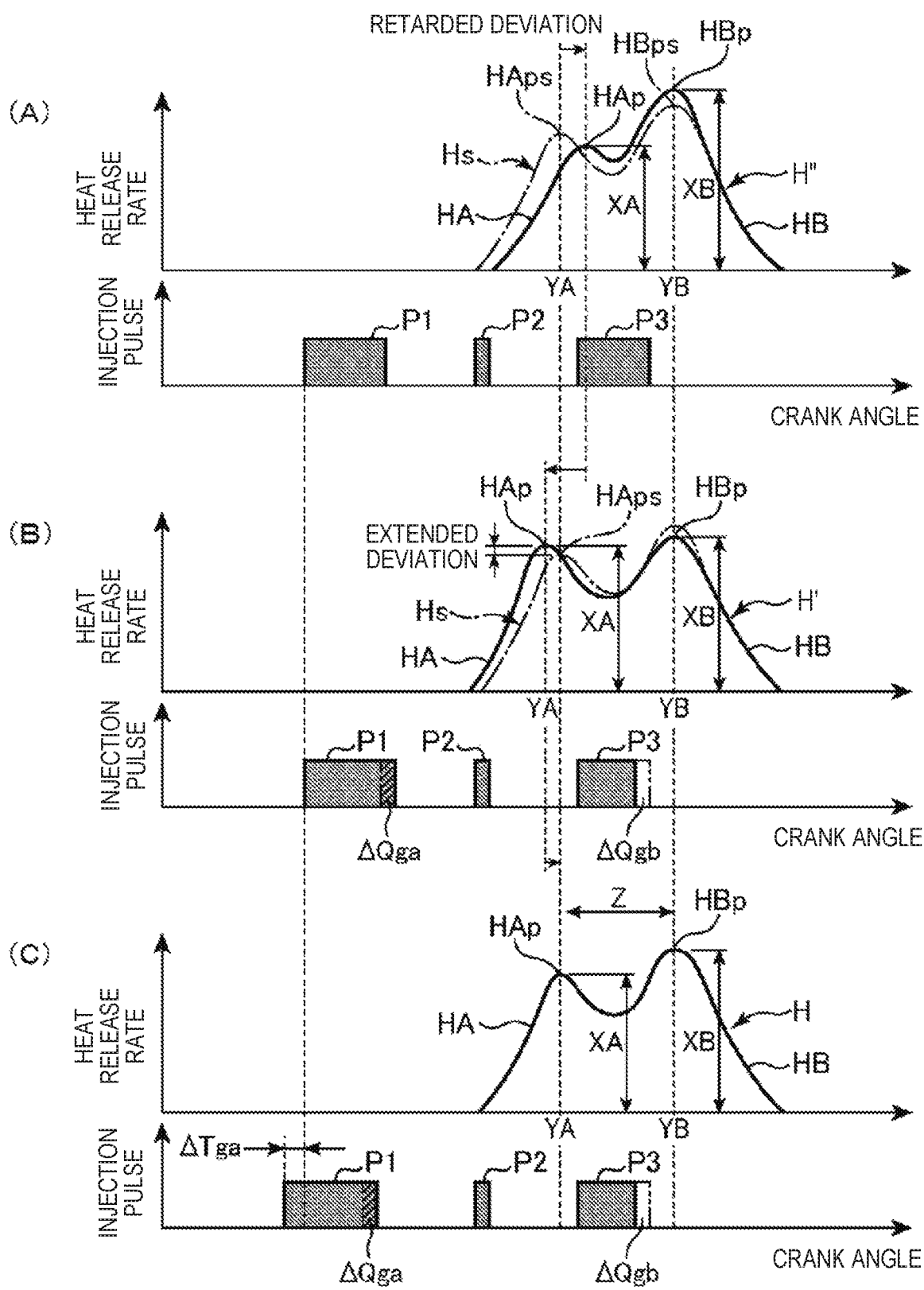
FIG. 20 is a graph illustrating a heat-release characteristic, where Chart (A) is a case where neither the injection amount nor the injection timing of the pre-injection is corrected when the intake air temperature decreases, Chart (B) is a case where only the injection amount of the pre-injection is corrected, and Chart (C) is a case where both of the injection amount and the injection timing of the pre-injection are corrected.

FIGS. 19 and 20 are views illustrating a situation where the deviation of the occurring timing YA of the first peak HAp is corrected by correcting the injection amount and the injection timing of the pre-injection P1. First, operation of the correction control performed during the increase of the intake air temperature is described using FIG. 19. Specifically, Chart (A) of FIG. 19 illustrates a waveform of the heat release rate in case of correcting neither of the injection amount nor the injection timing of the pre-injection P1 when the increase of the intake air temperature is detected as a heat-release characteristic H", Chart (B) illustrates a waveform of the heat release rate in case of correcting the injection amount of the pre-injection P1 (amount-reducing correction) as a heat-release characteristic H', and Chart (C) illustrates a waveform of the heat release rate in case of correcting the injection timing (retarding correction) in addition to the correction of the injection amount of the pre-injection P1 as a heat-release characteristic H. Note that in Charts (A) to (C) of FIG. 19, the waveforms of the heat release rate is illustrated in a state where the horizontal axis is expanded from that in other figures, such as FIG. 5, in order to emphasize the difference in the peak occurring timing. The same can be said for Charts (A) to (C) of FIG. 20 described later.

As illustrated in Chart (A) of FIG. 19, the heat-release characteristic H" (solid line) in case of correcting neither the injection amount nor the injection timing of the pre-injection P1 has the early-stage combustion portion HA accompanying the combustion of fuel injected by the pre-injection P1, and the late-stage combustion portion HB accompanying the combustion of fuel mainly injected by the main injection P3, similar to a target heat-release characteristic Hs (one-point chain line) illustrated for comparison. However, due to the increase of the intake air temperature, the occurring timing YA of the first peak HAp which is a peak of the early-stage combustion portion HA of the heat-release characteristic H" is moved to the advancing side compared with the occurring timing (target occurring timing) of a first peak HAps in the target heat-release characteristic Hs. That is, the advanced deviation occurs in the occurring timing YA of the first peak HAp. Moreover, in connection with this advanced deviation, the height XA of the first peak HAp is increased to a value slightly larger than the height (target height) of the first peak HAps in the target heat-release characteristic Hs. Note that the occurring timing of the second peak HBp which is a peak of the late-stage combustion portion HB of the heat-release characteristic H" is hardly changed from the occurring timing of a second peak HBps in the target heat-release characteristic Hs. This is because the late-stage combustion portion HB is mainly caused by the diffuse combustion of the main injection P3, and the occurring timing of the peak is mainly governed by the injection timing of the main injection P3.

On the other hand, as illustrated in Chart (B) of FIG. 19, in the heat-release characteristic H' obtained when the injection amount of the pre-injection P1 is corrected, the occurring timing YA of the first peak HAp is greatly moved to the retarding side. That is, by reducing the injection amount of the pre-injection P1 by the correction value (decreasing amount $\Delta Qfa$) derived through the processings at Steps S12 and S13 in FIG. 18, the advanced deviation of the occurring timing YA of the first peak HAp described above is excessively corrected, and, as a result, the occurring timing YA of the first peak HAp is moved to the retarding side exceeding the target occurring timing (target occurring timing of the first target peak HAps). However, the deviating amount to the retarding side caused here by the excessive correction is made smaller than the deviating amount to the advancing side caused before the correction. Note that in Chart (B) of FIG. 19, the injection amount of the main injection P3 is increased by $\Delta Qfb$ in connection with the amount-reducing correction of the pre-injection P1, and the total injection amount per one cycle is maintained accordingly at the same amount as Chart (A) of FIG. 19.

Here, decreasing the amount of the pre-injection P1 leads to the reduction of the height XA of the first peak HAp. Thus, if the injection amount of the pre-injection P1 is reduced somewhat excessively as described above, as illustrated in Chart (B) of FIG. 19, the height XA of the first peak HAp is lowered to a value smaller than the target height (target height of the first target peak HAps). That is, the cutback deviation occurs in the height XA of the first peak HAp.

On the other hand, as illustrated in Chart (C) of FIG. 19, in the heat-release characteristic H acquired when the injection timing of the pre-injection P1 is corrected, the height XA of the first peak HAp is increased by the amount corresponding to the cutback deviation described above. That is, by retarding the injection timing of the pre-injection P1 by the correction value (retarding amount $\Delta Tfa$) derived through the processings at Steps S14 and S15 in FIG. 18, the height XA of the first peak HAp is increased by the amount corresponding to the cutback deviation, and, as a result, the height XA of the first peak HAp becomes substantially in agreement with the target height. Further, as a result of moving the occurring timing YA of the first peak HAp to the advancing side under the influence of retarding the pre-injection P1, the deviation to the retarding side (Chart (B) of FIG. 19) caused by the excessive correction by decreasing the amount of the pre-injection P1 described above is canceled, and the occurring timing YA of the first peak HAp comes to be substantially in agreement with the target occurring timing.

Next, operation of the correction control performed when the intake air temperature decreases is described using FIG. 20. Specifically, Chart (A) of FIG. 20 illustrates a waveform of the heat release rate in case of correcting neither of the injection amount nor the injection timing of the pre-injection P1 when the decrease of the intake air temperature is detected as a heat-release characteristic H", Chart (B) illustrates a waveform of the heat release rate in case of only correcting the injection amount of the pre-injection P1 (amount-increasing correction) as a heat-release characteristic H', and Chart (C) of FIG. 20 illustrates a waveform of the heat release rate in case of correcting the injection timing (advancing correction) in addition to the correction of the injection amount of the pre-injection P1 as a heat-release characteristic H.

As illustrated in Chart (A) of FIG. 20, in the heat-release characteristic H" obtained when neither the injection amount nor the injection timing of the pre-injection P1 is corrected, the occurring timing YA of the first peak HAp is moved to the retarding side compared with the occurring timing (target occurring timing) of the first peak HAps in the target heat-release characteristic Hs. That is, the retarded deviation occurs in the occurring timing of the first peak HAp. Moreover, in connection with this retarded deviation, the height XA of the first peak HAp is lowered to a value slightly smaller than the height (target height) of the first peak HAps in the target heat-release characteristic Hs.

On the other hand, as illustrated in Chart (B) of FIG. 20, in the heat-release characteristic H' obtained when the injection amount of the pre-injection P1 is corrected, the occurring timing YA of the first peak HAp is greatly moved to the advancing side. That is, by increasing the injection amount of the pre-injection P1 by the correction value (increasing amount $\Delta Qga$) derived through the processings at Steps S19 and S20 in FIG. 18, the retarded deviation of the occurring timing YA of the first peak HAp described above is excessively corrected, and, as a result, the occurring timing YA of the first peak HAp is moved to the advancing side exceeding the target occurring timing (target occurring timing of the first target peak HAps). However, the deviating amount to the advancing side caused here by the excessive correction is made smaller than the deviating amount to the retarding side caused before the correction. Note that in Chart (B) of FIG. 20, the injection amount of the main injection P3 is reduced by ΔQgb in connection with the amount-increasing correction of the pre-injection P1, and the total injection amount per one cycle is maintained accordingly at the same amount as that in Chart (A) of FIG. 20.

Here, the increase in the amount of the pre-injection P1 leads to the increase of the height XA of the first peak HAp. Thus, if the injection amount of the pre-injection P1 is increased somewhat excessively as described above, the height XA of the first peak HAp is increased to a value larger than the target height (target height of the first target peak HAps) as illustrated in Chart (B) of FIG. 20. That is, the extended deviation occurs in the height XA of the first peak HAp.

On the other hand, as illustrated in Chart (C) of FIG. 20, in the heat-release characteristic H acquired when the injection timing of the pre-injection P1 is corrected, the height XA of the first peak HAp is lowered by the amount corresponding to the extended deviation described above. That is, by advancing the injection timing of the pre-injection P1 by the correction value (advancing amount ΔTga) derived through the processings at Steps S21 and S22 in FIG. 18, the height XA of the first peak HAp is reduced by the amount corresponding to the extended deviation, and, as a result, the height XA of the first peak HAp comes to be substantially in agreement with the target height. Further, as a result of moving the occurring timing YA of the first peak HAp to the retarding side under the influence of advancing the pre-injection P1, the deviation to the advancing side (Chart (B) of FIG. 20) caused by the excessive correction by increasing the amount of the pre-injection P1 described above is canceled, and the occurring timing YA of the first peak HAp comes to be substantially in agreement with the target occurring timing.

[Operation and Effects]

As described above, in this embodiment, while the pre-injection P1 and the main injection P3 are performed during the operation in the PCI range so that the heat-release characteristic including the first peak HAp and the second peak HBp is acquired, the interval (peak interval) Z between the first peak HAp and the second peak HBp is set as the interval so that the pressure waves caused by combustion of fuel of the pre-injection P1 and the main injection P3 cancel each other out (i.e., substantially half of the cycle Fw of the pressure waves). Therefore, the sound pressure level of combustion noise caused by the pre-injection P1 and the main injection P3 can be effectively reduced by the mutual interference, and highly silent combustion where the noise, such as diesel-knock sound, is fully controlled can be realized.

Moreover, since the injection amount of the pre-injection P1 is reduced (increased) and the injection timing of the pre-injection P1 is retarded (advanced) when the intake air temperature increases (decreases), the deviation of the first peak HAp caused by the increase (decrease) of the intake air temperature can be corrected, thereby preventing beforehand the increase of combustion noise which may be caused by the deviation.

For example, when the intake air temperature increases, while the occurring timing YA of the first peak HAp is moved to the advancing side of the target value (i.e., the timing at which the interval to the second peak HBp becomes the expected interval), the height XA of the first peak HAp becomes higher than the target value (refer to Chart (A) of FIG. 19). On the other hand, since in this embodiment the injection amount of the pre-injection P1 is reduced and the injection timing is retarded when the increase of the intake air temperature is detected, the deviation of the first peak HAp as described above can be corrected, and while the heights XA and XB of the first peak HAp and the second peak HBp are brought near the target values, the interval Z between the peaks HAp and HBp can be maintained at the interval described above which is advantageous in terms of combustion noise (refer to Chart (C) of FIG. 19).

On the other hand, when the intake air temperature decreases, while the occurring timing YA of the first peak HAp is moved to the retarding side of the target value, the height XA of the first peak HAp becomes lower than the target value (refer to Chart (A) of FIG. 20). On the other hand, since in this embodiment the injection amount of the pre-injection P1 is increased and the injection timing is advanced when the intake air temperature decreases, the deviation of the first peak HAp can be corrected, and while the heights XA and XB of the first peak HAp and the second peak HBp are brought near the target values, the interval Z between the peaks HAp and HBp can be maintained at the interval described above which is advantageous in terms of combustion noise (refer to Chart (C) of FIG. 20).

As described above, according to this embodiment, combustion noise can fully be reduced regardless of the change in the intake air temperature, thereby effectively improving the market value of the engine.

Moreover, in this embodiment, while the injection timing of the pre-injection P1 is set at the timing fully advanced from the compression top dead center so that the fuel injected by the pre-injection P1 carries out the PCI combustion (premixed compression ignition combustion), the start timing of the main injection P3 is set at the timing after the occurring timing YA of the first peak HAp (the peak by PCI combustion of fuel injected by the pre-injection P1) so that the fuel injected by the main injection P3 carries out the diffuse combustion. According to such a configuration, since the mode of combustion by the main injection P3 which causes the second peak HBp is the diffuse combustion in which the period from the start of the injection to the ignition (ignition delay period) is difficult to be influenced by the environmental factors, the occurring timing YB of the second peak HBp can be found definitely from the injection timing of the main injection P3. Thus, by adjusting the injection amount and/or the injection timing of the pre-injection P1 while fixing the injection timing of the main injection P3, the interval Z between the first peak HAp and the second peak HBp can be brought into the expected interval (the interval at which the combustion pressure waves cancel each other out) with sufficient accuracy, thereby stably securing the noise control effect.

Moreover, in this embodiment, when the increase (decrease) of the intake air temperature is detected, while the advanced deviation (retarded deviation) which is the amount by which the occurring timing YA of the first peak HAp is shifted to the advancing side (retarding side) from the target timing due to the increase (decrease) of the intake air temperature is estimated, the decreasing amount ΔQfa (increasing amount ΔQga) of the injection amount of the pre-injection P1 is set so that the occurring timing YA of the first peak HAp is retarded (advanced) more than the estimated advanced deviation (retarded deviation). Further, based on the set decreasing amount ΔQfa (increasing amount ΔQga) of the injection amount of the pre-injection P1, while the cutback deviation (extended deviation) which is the reducing amount (increasing amount) of the height XA of the first peak HAp from the target height by the reduction (increase) of the injection amount is estimated, the retarding amount ΔTfa (advancing amount ΔTga) of the injection timing of the pre-injection P1 is set so that the height of the first peak HAp is increased (decreased) by the amount corresponding to the estimated cutback deviation (extended deviation). According to such a configuration, the decreasing amount ΔQfa (increasing amount ΔQga) and the retarding amount ΔTfa (advancing amount ΔTga) of the pre-injection P1 can be calculated appropriately by the calculation so that the final occurring timing YA and the final height XA of the first peak HAp which are achieved by the combination of reducing (increasing) of the amount of the pre-injection P1 and retarding (advancing) of the pre-injection P1 are brought near the target value, thereby fully reducing combustion noise.

[Modifications]

As described above, although the embodiment of the present disclosure is described, the present disclosure is not limited to this embodiment, and, for example, the following modifications can be adopted.

(1) Although not particularly described in the above embodiment, when the deviation of the first peak HAp accompanying the decrease of the intake air temperature is comparatively large, the advancing amount ΔTga of the injection timing of the pre-injection P1 set in order to correct the deviation also becomes comparatively large. Therefore, if this is permitted without any restriction, it may become impossible to feed the fuel injected by the pre-injection P1 to a suitable position inside the combustion chamber 6 (i.e., inside the cavity 5C). Thus, it is possible to vary the number of the pre-injections P1 according to the advancing amount of the pre-injection P1. Charts (A) and (B) of FIG. 21 are graphs illustrating one example when adopting this measure. Note that the crank angle W in the charts is a crank angle indicative of a limit of the advancing amount (advancing limit) of the pre-injection P1, and is an example of a "given crank angle" in the present disclosure.

In the example illustrated in Charts (A) and (B) of FIG. 21, the number of injections of the pre-injection P1 is variably set as once or twice according to the advancing amount ΔTga of the pre-injection P1 calculated based on the extended deviation of the height XA of the first peak HAp. For example, suppose that the advancing amount ΔTga calculated at Step S22 of FIG. 18 described above is a comparatively small value so that the pre-injection P1 is started after the advancing limit W. That is, even if the pre-injection P1 is actually advanced by the calculated advancing amount ΔTga, the start timing of the pre-injection P1 becomes the same timing as or a retarded timing than the advancing limit W. In this case, as illustrated in Chart (A) of FIG. 21, the number of the pre-injections P1 is set as once, which is the same as the above embodiment.

On the other hand, suppose that the advancing amount ΔTga calculated at Step S22 is a large value so that the pre-injection P1 is started at the advancing side of the advancing limit W. That is, if the pre-injection P1 is actually advanced by the calculated advancing amount ΔTga, the start timing of the pre-injection P1 will be at the further advancing side of the advancing limit W. In this case, as illustrated in Chart (B) of FIG. 21, the number of the pre-injections P1 is increased to twice, while holding the start timing of the pre-injection P1 at the advancing limit W. Thus, while the fuel injected by the pre-injection P1 is fed to the suitable position inside the combustion chamber 6 (inside the cavity 5C), two injections which are temporally divided are performed as the pre-injection P1 so that a penetration of fuel becomes weaker. Therefore, during the period from the start of the injection to the ignition, homogenization of the mixture gas inside the combustion chamber 6 (mainly, cavity 5C) can be facilitated, thereby acquiring the same effect as if the injection timing is advanced. Thus, while clean combustion in which the air utilization of fuel is fully secured can be realized, the deviation of the first peak HAp can be corrected appropriately and combustion noise can be reduced.

Note that in the modification illustrated in Charts (A) and (B) of FIG. 21, the number of times to divide the pre-injection P1 is not limited to twice, but it may be three times or more. For example, when a large advancing amount ΔTga which exceeds the advancing limit W is calculated, the number of divisions may be increased gradually, like twice to three times, as the exceeding amount from the advancing limit W increases. Moreover, in the above modification, when the large advancing amount ΔTga which exceeds the advancing limit W is calculated, the pre-injection P1 is divided into a plurality of injections, while holding the start timing of the pre-injection P1 at the advancing limit W. However, with consideration of the reduction of the penetration caused by the divided injection, an advance of the start timing of the pre-injection P1 to a timing advanced slightly from the advancing limit W may be permitted.

(2) In the above embodiment, the intake-air-temperature sensor SN4 is provided to the part of the intake passage 30 between the introductory part of the EGR gas (the outlet part of the EGR passage 44A) and the intercooler 33, i.e., the part into which the intake air before the EGR gas is mixed flows, and when the intake air temperature detected by the intake-air-temperature sensor SN4 increases (decreases), the increasing amount (decreasing amount) of the in-cylinder gas temperature is estimated by calculation based on the detected increasing amount (decreasing amount). However, a temperature sensor may be provided at a position where the temperature of the intake air after the EGR gas is mixed is detectable (e.g., the surge tank 34), and this temperature sensor may directly identify the increasing amount (decreasing amount) of the in-cylinder gas temperature.

(3) Although in the above embodiment the example in which the pre-injection P1, the middle injection P2, and the main injection P3 are performed as the injection pattern of fuel is illustrated, this is merely an example, and, for example, the middle injection P2 may be omitted. Alternatively, an after injection for reducing the generation of soot may be performed after the main injection P3. Further, each of the pre-injection P1 and the main injection P3 may be divided into a plurality of injections.

(4) Although in the above embodiment the example in which the cavity 5C of the piston 5 which defines the bottom surface of the combustion chamber 6 has the two-stage egg shape provided with the first cavity part 51 and the second cavity part 52 is illustrated, the fuel injection control of the present disclosure may also be applied to the cavity 5C having other dented shapes, not limiting to the two-stage egg shape.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

6 Combustion Chamber
15 Injector

72 Fuel Injection Controlling Module
SN4 Intake-Air-Temperature Sensor
P1 Pre-Injection
P3 Main Injection
ΔQfa Decreasing Amount (of Injection Amount of Pre-Injection)
ΔTfa Retarding Amount (of Injection Timing of Pre-Injection)
ΔQga Increasing Amount (of Injection Amount of Pre-Injection)
ΔTga Advancing Amount (of Injection Timing of Pre-Injection)
HAp First Peak
XA Height (of First Peak)
YA Occurring Timing (of First Peak)
HBp Second Peak
Z Peak Interval
W Advancing Limit (Given Crank Angle)

What is claimed is:

1. A control device for a compression ignition engine causing fuel injected into a combustion chamber from an injector to combust by compression ignition, comprising:
  an intake-air-temperature sensor configured to acquire an intake air temperature that is a temperature of intake air supplied to the combustion chamber; and
  a processor configured to execute a fuel injection controlling module to control an injection amount and an injection timing of the fuel by the injector,
  wherein the fuel injection controlling module causes the injector to perform a pre-injection in which fuel is injected at an advancing side of a compression top dead center, and a main injection in which fuel is injected during combustion of the fuel injected by the pre-injection,
  wherein the fuel injection controlling module sets fuel injection timings of the pre-injection and the main injection so that an interval between a first peak of a heat release rate resulting from the combustion of the fuel injected by the pre-injection and a second peak of the heat release rate resulting from the combustion of the fuel injected by the main injection becomes an interval to make pressure waves caused by the combustions of the fuel of the pre-injection and the main injection cancel each other out, and
  wherein when an increase of the intake air temperature is detected by the intake-air-temperature sensor, the fuel injection controlling module controls the injector to reduce the injection amount of the pre-injection and retard the injection timing of the pre-injection compared with a case where the increase of the intake air temperature is not detected.

2. The control device of claim 1, wherein when the increase of the intake air temperature is detected, the fuel injection controlling module estimates an advanced deviation that is an amount by which an occurring timing of the first peak is shifted to the advancing side from a target timing due to the increase of the intake air temperature, and sets a decreasing amount of the injection amount of the pre-injection so that the occurring timing of the first peak is retarded more than the estimated advanced deviation.

3. The control device of claim 2, wherein when the increase of the intake air temperature is detected, the fuel injection controlling module estimates a cutback deviation that is an amount by which a height of the first peak is reduced from a target height due to the injection amount of the pre-injection being decreased by the set decreasing amount, and sets a retarding amount of the injection timing of the pre-injection so that the height of the first peak increases by an amount corresponding to the estimated cutback deviation.

4. The control device of claim 1,
  wherein the fuel injection timing of the pre-injection is set at a timing advanced from the compression top dead center by a given amount so that the fuel injected by the pre-injection carries out premixed compression ignition combustion,
  wherein an estimation to estimate a heat-release characteristic is performed based on setting values of the injection timing of the pre-injection and the injection amount of the pre-injection, and
  wherein the main injection is started during a combustion period of the fuel injected by the pre-injection and at a retarding side of a crank angle at which the first peak estimated by the estimation occurs so that the fuel injected by the main injection carries out diffuse combustion.

5. A control device for a compression ignition engine causing fuel injected into a combustion chamber from an injector to combust by compression ignition, comprising:
  an intake-air-temperature sensor configured to acquire an intake air temperature that is a temperature of intake air supplied to the combustion chamber; and
  a processor configured to execute a fuel injection controlling module to control an injection amount and an injection timing of the fuel by the injector,
  wherein the fuel injection controlling module causes the injector to perform a pre-injection in which fuel is injected at an advancing side of a compression top dead center, and a main injection in which fuel is injected during combustion of the fuel injected by the pre-injection,
  wherein the fuel injection controlling module sets fuel injection timings of the pre-injection and the main injection so that an interval between a first peak of heat release rate resulting from the combustion of the fuel injected by the pre-injection and a second peak of the heat release rate resulting from the combustion of fuel injected by the main injection becomes an interval to make pressure waves caused by the combustion of the fuel of the pre-injection and the main injection cancel each other out, and
  wherein when a decrease of the intake air temperature is detected by the intake-air-temperature sensor, the fuel injection controlling module controls the injector to increase the injection amount of the pre-injection and advance the injection timing of the pre-injection compared with a case where the decrease of the intake air temperature is not detected.

6. The control device of claim 5, wherein when the decrease of the intake air temperature is detected, the fuel injection controlling module estimates a retarded deviation that is an amount by which an occurring timing of the first peak is shifted to a retarding side from a target timing due to the decrease of the intake air temperature, and sets an increasing amount of the injection amount of the pre-injection so that the occurring timing of the first peak is advanced more than the estimated retarded deviation.

7. The control device of claim 6, wherein when the decrease of the intake air temperature is detected, the fuel injection controlling module estimates an extended deviation that is an amount by which a height of the first peak is increased from a target height due to the injection amount of the pre-injection being increased by the set increasing amount, and sets an advancing amount of the injection timing of the pre-injection so that the height of the first peak decreases by an amount corresponding to the estimated extended deviation.

8. The control device of claim 7, wherein the fuel injection controlling module performs a plurality of divided injections of the pre-injection when the advancing amount of the injection timing of the pre-injection is calculated as a large value so that the pre-injection is started at the advancing side of a given crank angle.

* * * * *